United States Patent
Nonoyama et al.

(10) Patent No.: US 11,027,691 B2
(45) Date of Patent: Jun. 8, 2021

(54) AIRBAG

(71) Applicant: TOYODA GOSEI CO., LTD., Kiyosu (JP)

(72) Inventors: Yoshinori Nonoyama, Kiyosu (JP); Hiroki Imaeda, Kiyosu (JP); Tomoya Sugiyama, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 162 days.

(21) Appl. No.: 16/138,400

(22) Filed: Sep. 21, 2018

(65) Prior Publication Data

US 2019/0092266 A1    Mar. 28, 2019

(30) Foreign Application Priority Data

Sep. 28, 2017 (JP) .............................. JP2017-188202
Aug. 1, 2018 (JP) .............................. JP2018-145347

(51) Int. Cl.
| | |
|---|---|
| *B60R 21/2346* | (2011.01) |
| *B60R 21/232* | (2011.01) |
| *B60R 21/233* | (2006.01) |
| *B60R 21/231* | (2011.01) |
| *B60R 21/235* | (2006.01) |
| *B60R 21/214* | (2011.01) |

(52) U.S. Cl.
CPC ........ *B60R 21/2346* (2013.01); *B60R 21/231* (2013.01); *B60R 21/233* (2013.01); *B60R 21/235* (2013.01); *B60R 21/214* (2013.01); *B60R 21/232* (2013.01); *B60R 2021/23192* (2013.01); *B60R 2021/23324* (2013.01); *B60R 2021/23576* (2013.01)

(58) Field of Classification Search
CPC .................................................. B60R 21/2346
See application file for complete search history.

(56) References Cited

U.S. PATENT DOCUMENTS

| | | | |
|---|---|---|---|
| 5,913,535 A * | 6/1999 | Taguchi | .............. B60R 21/2346 |
| | | | 280/729 |
| 6,749,220 B1 | 6/2004 | Wipasuramonton et al. | |
| 7,163,232 B2 * | 1/2007 | Yokoyama | ............ B60R 21/201 |
| | | | 280/730.2 |

(Continued)

FOREIGN PATENT DOCUMENTS

| | | | | |
|---|---|---|---|---|
| CN | 2014-K07018 | * | 4/2014 | |
| DE | 102013220269 A1 * | | 4/2014 | ........... B60R 21/231 |

(Continued)

*Primary Examiner* — Nicole T Verley
(74) *Attorney, Agent, or Firm* — Posz Law Group, PLC

(57) ABSTRACT

An airbag includes a body and a redirecting cloth that is composed of a sheet material having flexibility and disposed inside the body. The redirecting cloth includes an inlet port for taking in an inflation gas; one or more outlet ports that release the inflation gas as flown from the inlet port towards predetermined regions of the body; and a sew region that sews first and second terminal edges of the sheet material together. Each of the first and second terminal edges of the sheet material includes a turned-and-sewn region that has been turned inward and sewn. At least a part of the sew region is formed by sewing terminals of the turned-and-sewn regions together.

8 Claims, 27 Drawing Sheets

(56) References Cited

U.S. PATENT DOCUMENTS

| | | | | |
|---|---|---|---|---|
| 7,942,441 | B2 * | 5/2011 | Magnin | B60R 21/2346 280/740 |
| 8,006,999 | B2 * | 8/2011 | Suemitsu | B60R 21/2346 280/730.2 |
| 8,235,415 | B2 * | 8/2012 | Gamill | B60R 21/2346 280/730.2 |
| 9,393,928 | B2 * | 7/2016 | Lee | B60R 21/2346 |
| 9,688,233 | B2 * | 6/2017 | Lee | B60R 21/232 |
| 9,873,399 | B2 * | 1/2018 | Goto | B60R 21/231 |
| 10,000,177 | B2 * | 6/2018 | Mihm | B60R 21/237 |
| 2003/0201628 | A1 * | 10/2003 | Roychoudhury | B60R 21/2346 280/729 |
| 2004/0104563 | A1 * | 6/2004 | Fischer | B60R 21/232 280/743.1 |
| 2009/0295134 | A1 * | 12/2009 | Wold | B60R 21/235 280/741 |
| 2014/0014253 | A1 | 1/2014 | Traber et al. | |
| 2014/0103625 | A1 * | 4/2014 | Thomas | B60R 21/2346 280/730.2 |
| 2016/0280179 | A1 * | 9/2016 | Jinnai | B60R 21/2171 |

FOREIGN PATENT DOCUMENTS

| | | | | |
|---|---|---|---|---|
| DE | 102014108223 A1 | * | 12/2015 | ......... B60R 21/2346 |
| EP | 3360734 A1 | * | 8/2018 | ........... B60R 21/237 |
| JP | H10-129380 A | | 5/1998 | |
| JP | 2003-025946 A | | 1/2003 | |
| JP | 2003-165413 A | | 6/2003 | |
| JP | 2010089544 A | * | 4/2010 | ......... B60R 21/2346 |
| JP | 4535109 B2 | * | 9/2010 | |
| JP | 2011201518 A | * | 10/2011 | |
| JP | 2012-091574 A | | 5/2012 | |
| JP | 5071505 B2 | * | 11/2012 | |
| JP | 5163471 B2 | | 3/2013 | |
| JP | 5488390 B2 | * | 5/2014 | |
| JP | 5675493 B2 | * | 2/2015 | ......... B60R 21/2346 |
| JP | 5743722 B2 | * | 7/2015 | ........... B60R 21/261 |
| JP | 2015-147528 A | | 8/2015 | |
| JP | 2016-016685 A | | 2/2016 | |
| JP | 5968292 B2 | * | 8/2016 | |
| JP | 6129761 B2 | * | 5/2017 | |
| JP | 6138731 B2 | * | 5/2017 | |
| JP | 6411984 B2 | | 10/2018 | |
| WO | WO-2010122852 A1 | * | 10/2010 | ......... B60R 21/2346 |
| WO | WO-2012165539 A1 | * | 12/2012 | ........... B60R 21/232 |
| WO | WO-2013035647 A1 | * | 3/2013 | ........... B60R 21/232 |
| WO | WO-2013080922 A1 | * | 6/2013 | ........... B60R 21/232 |
| WO | WO-2016088598 A1 | * | 6/2016 | ........... B60R 21/232 |

* cited by examiner

FIG. 8
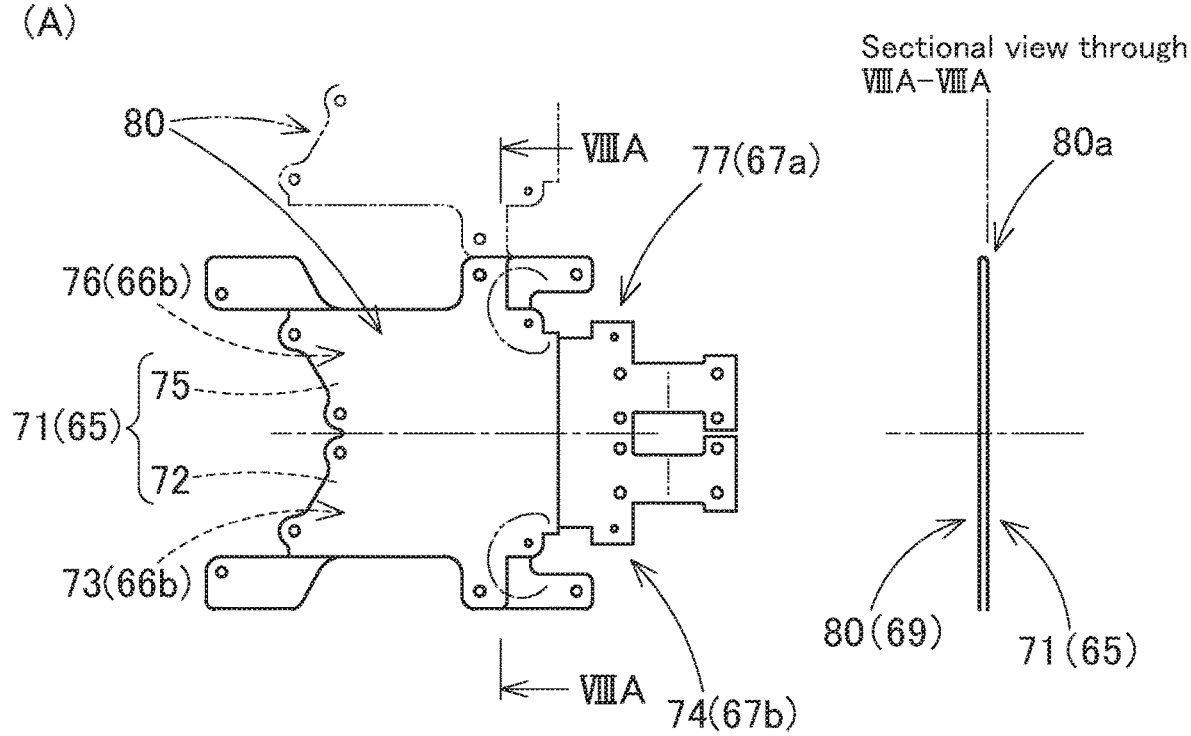
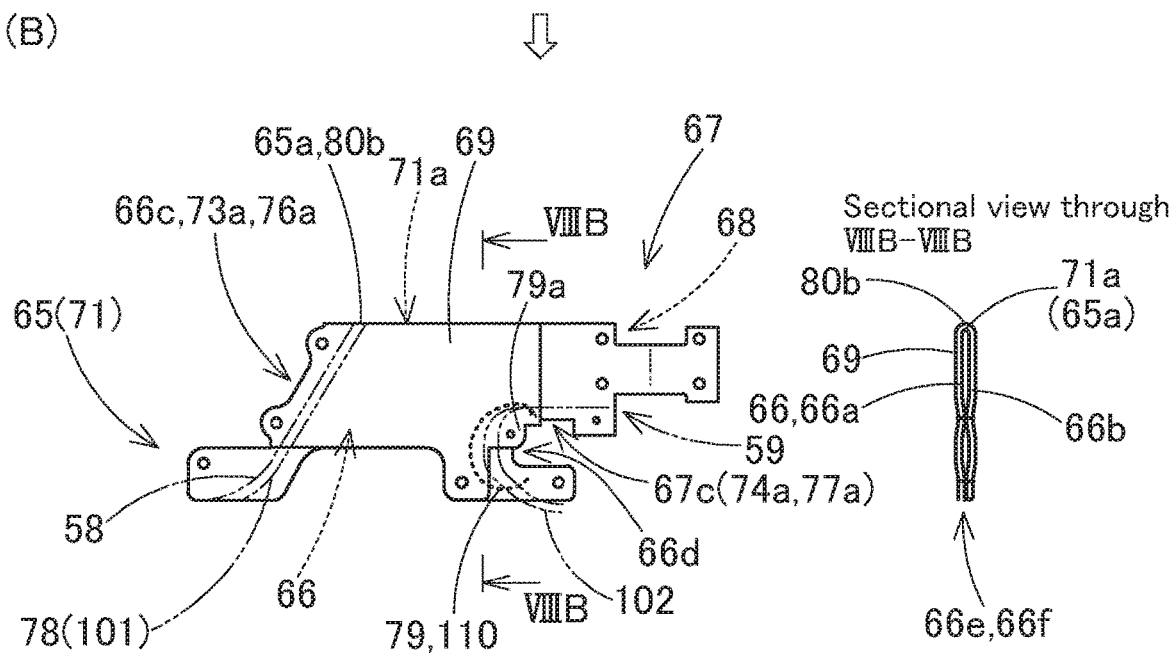

FIG. 11
(A)
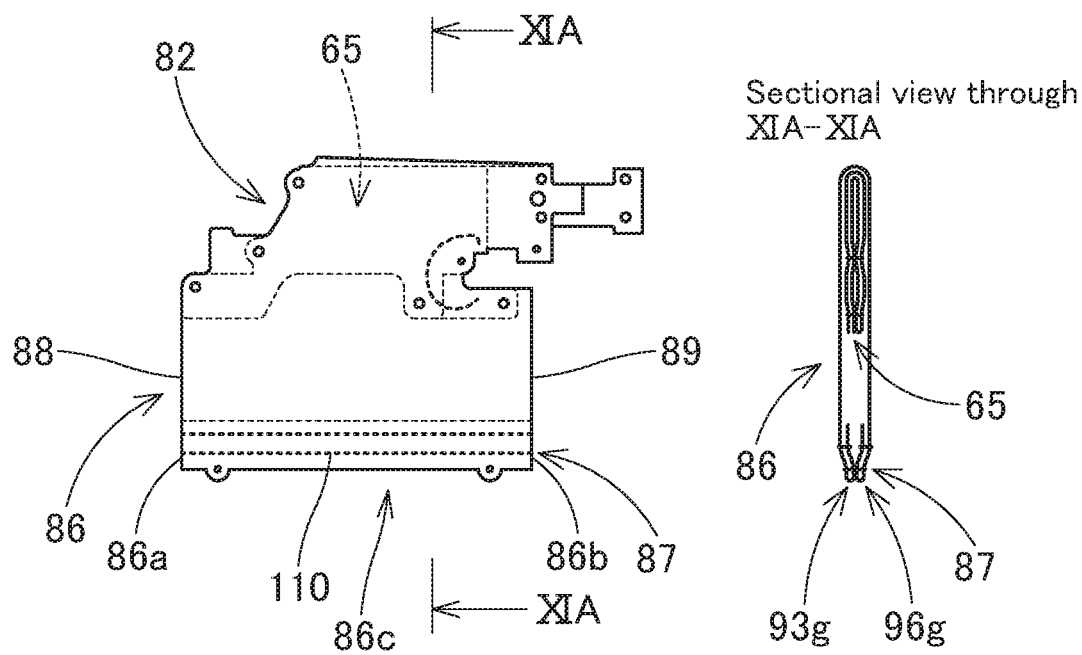
(B)
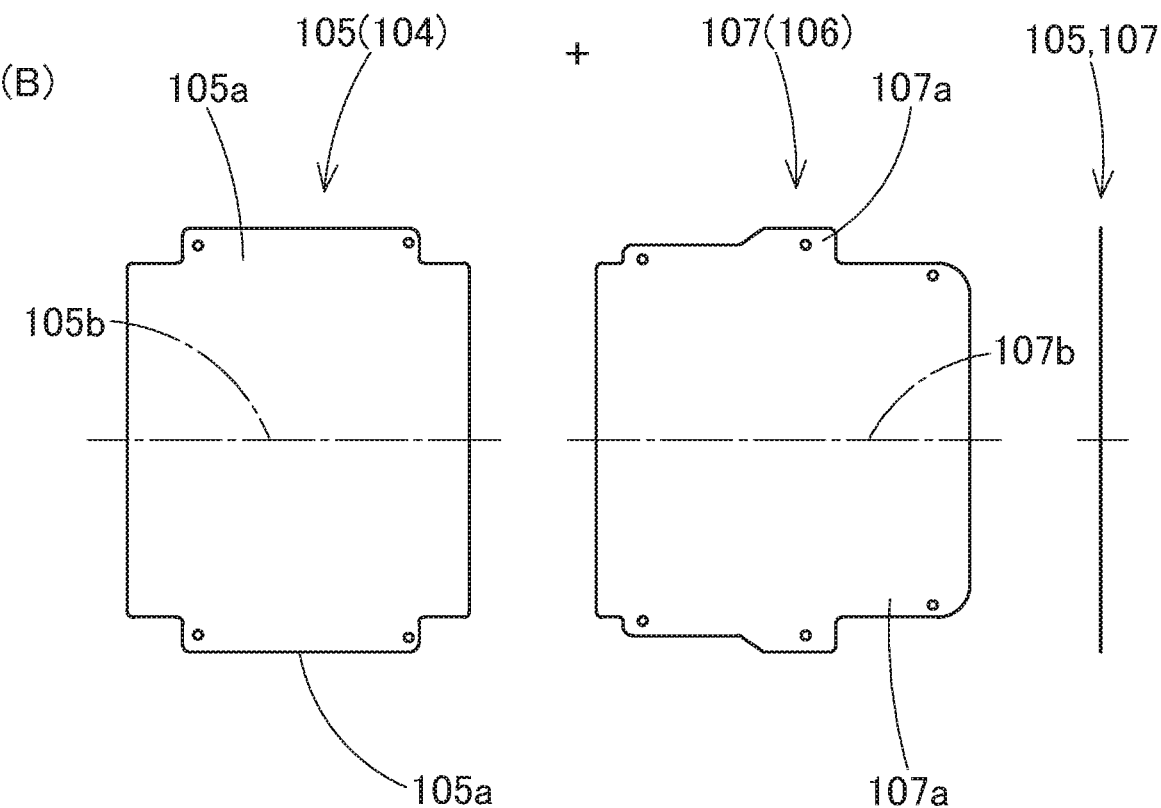

FIG. 12
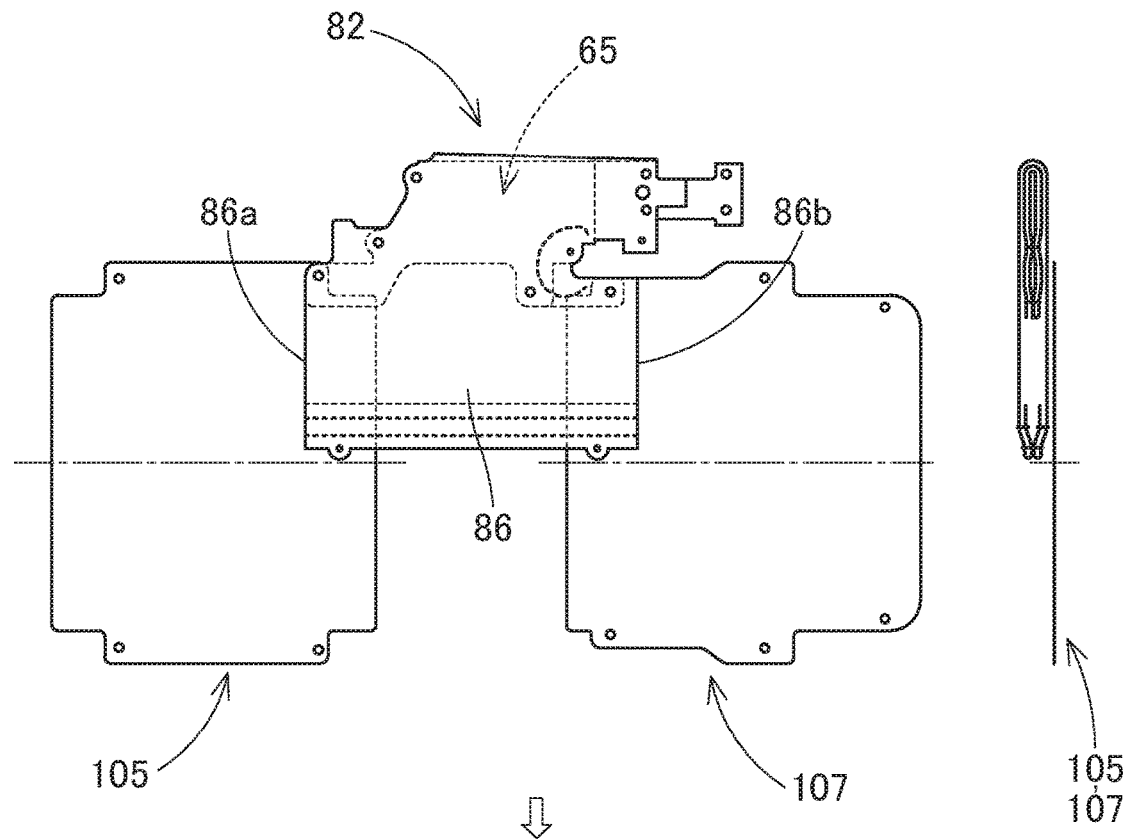
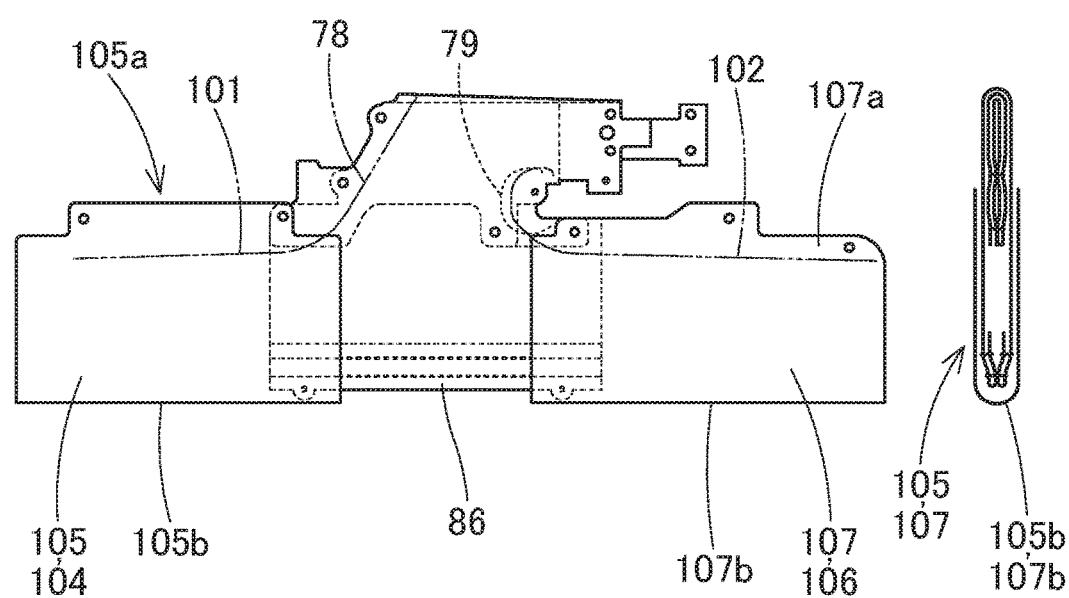

FIG. 14
(A)
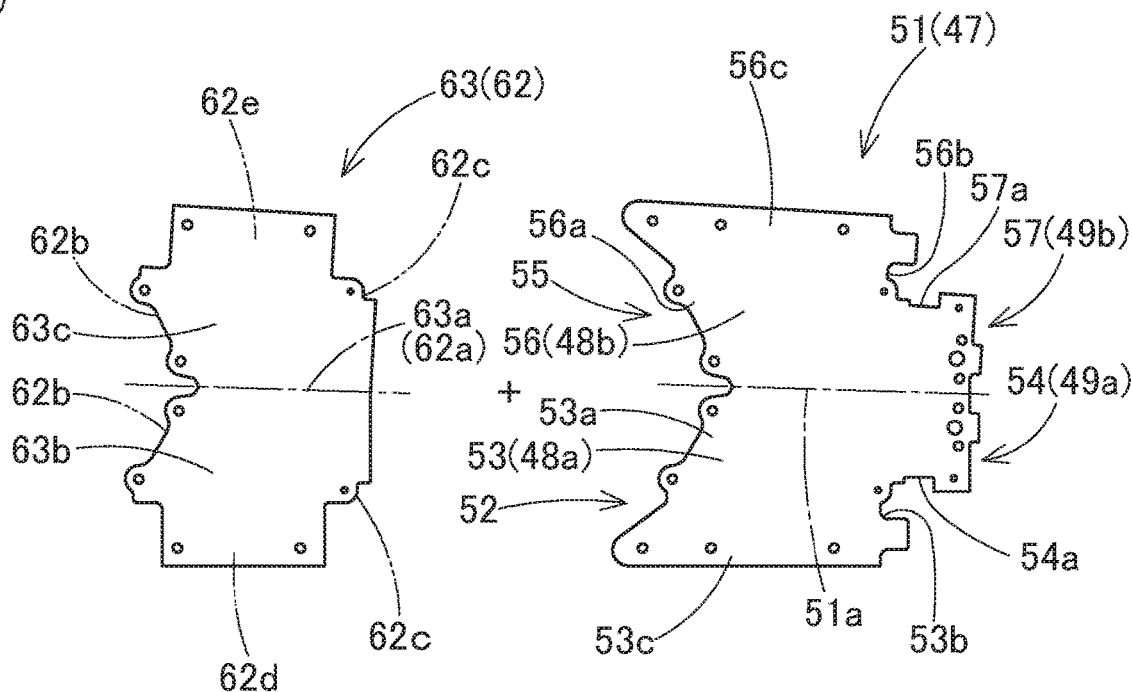
(B)
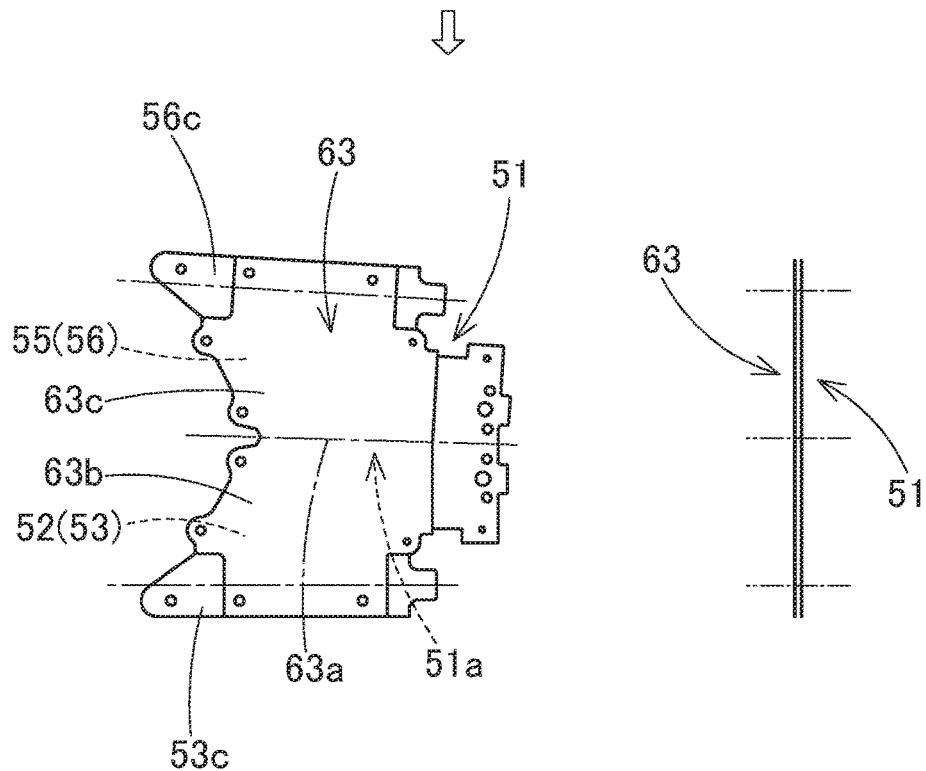

FIG. 15
(A)
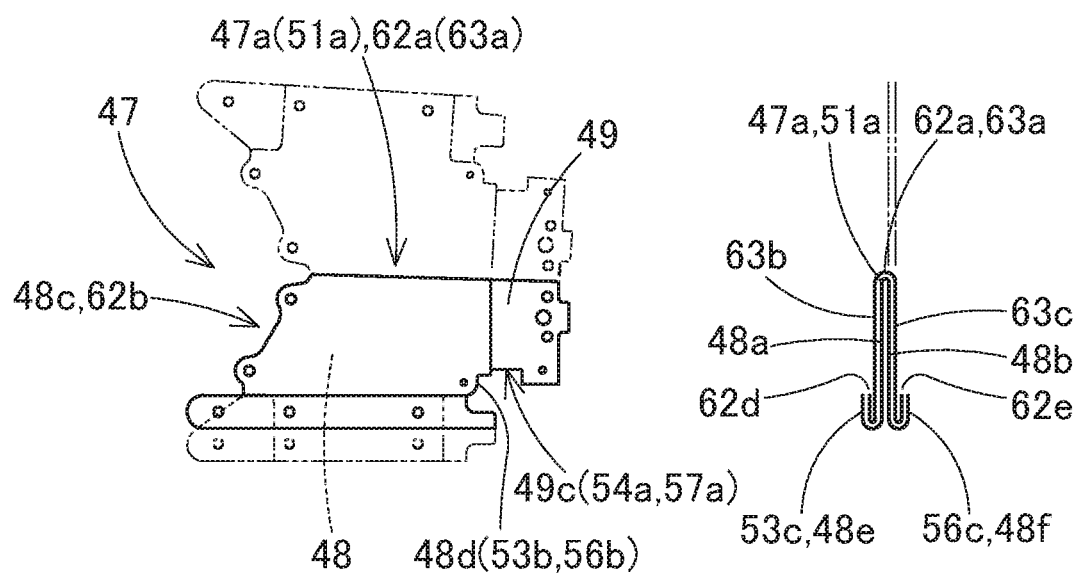
(B)
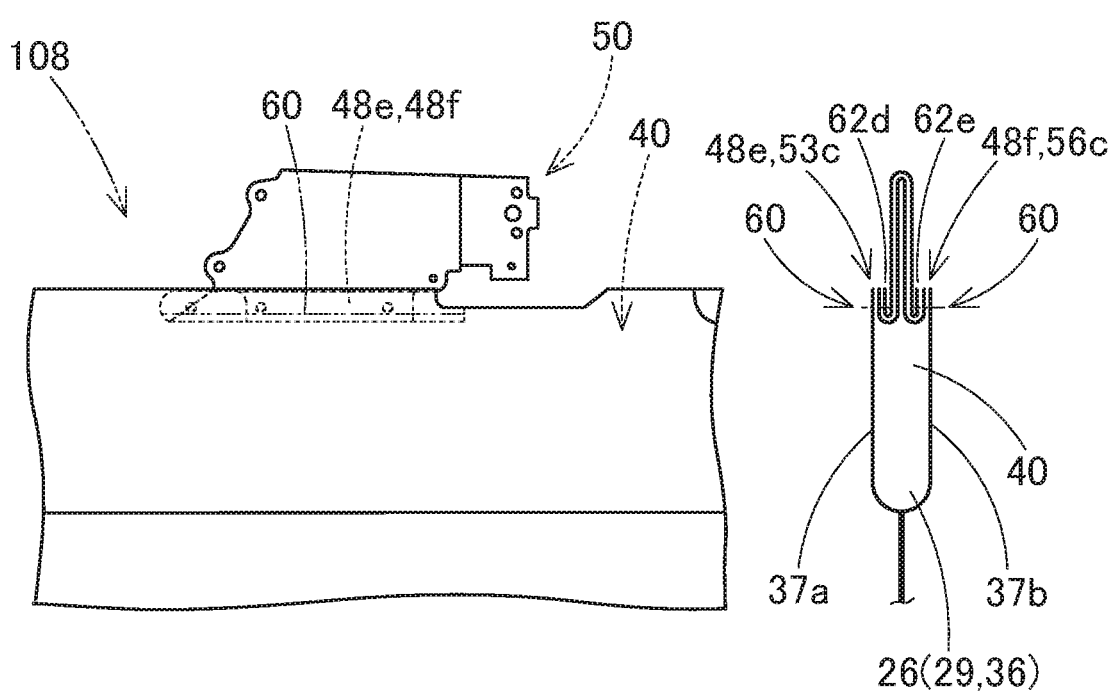

FIG. 17
(A)
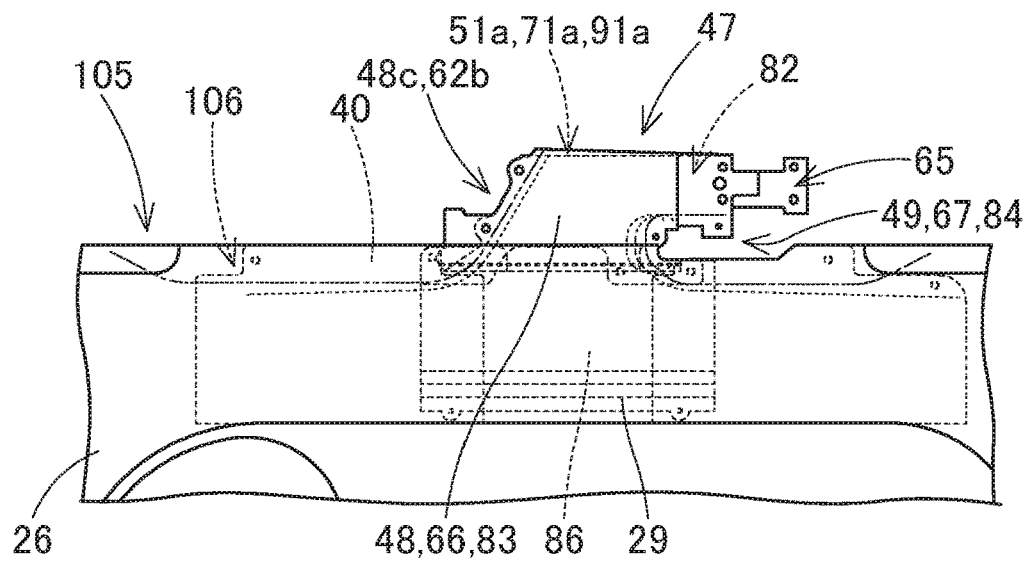
(B)
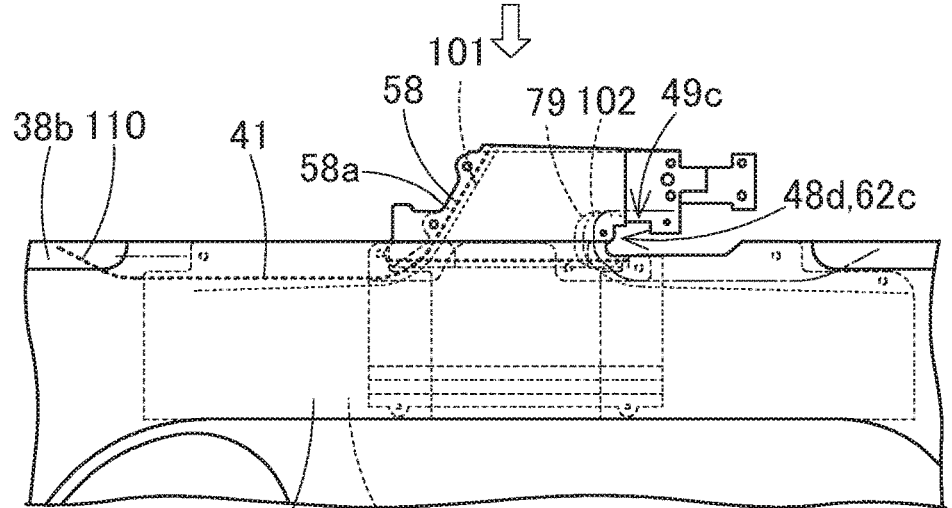
(C)
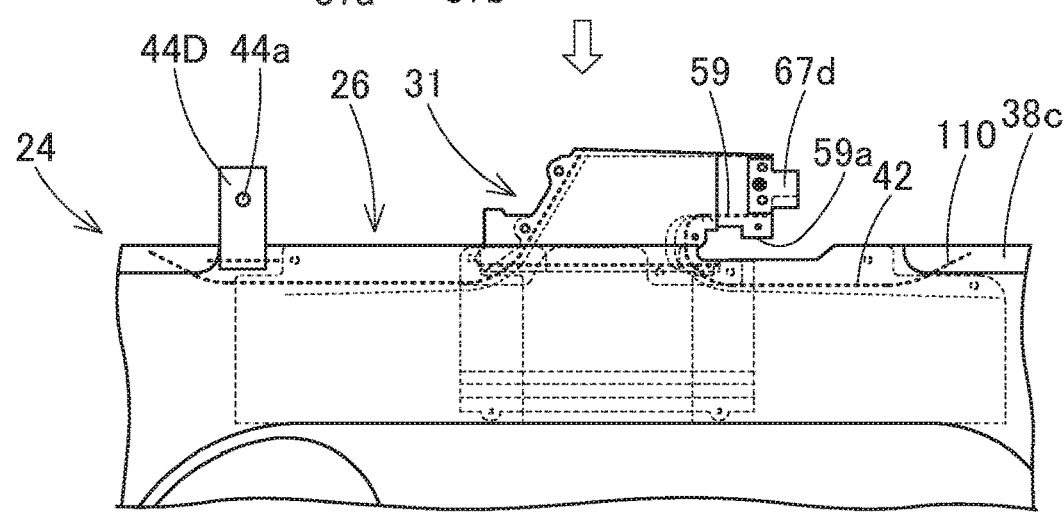

FIG. 21
(A)
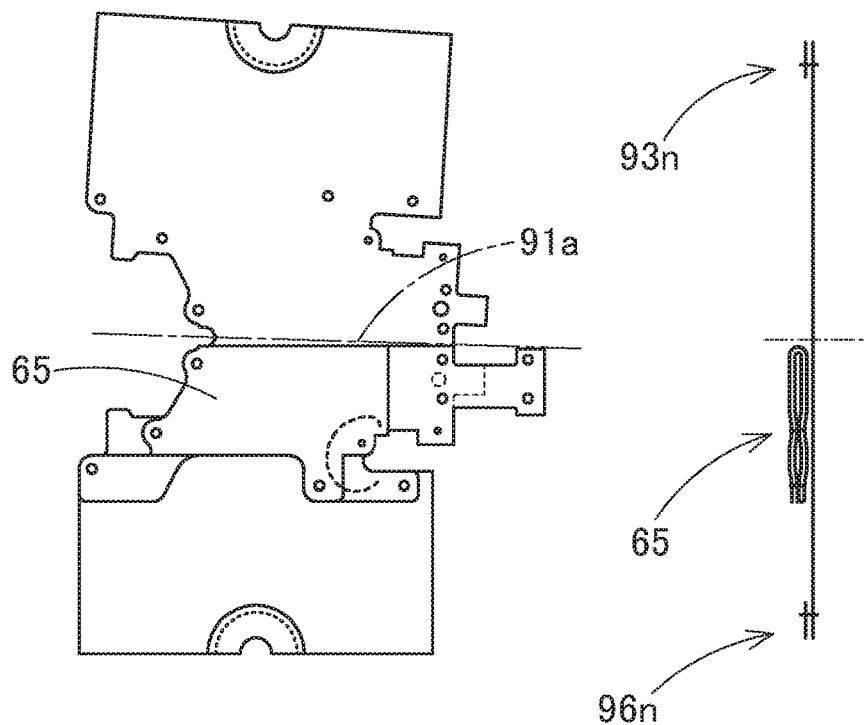
(B)
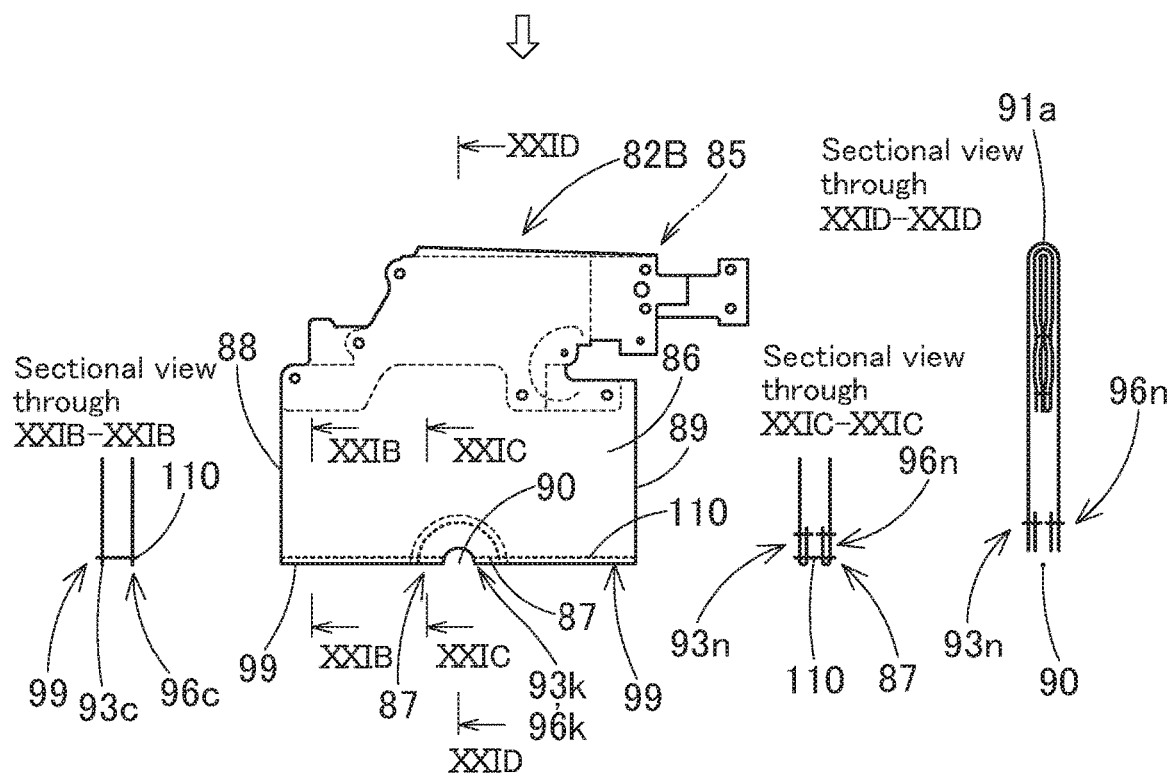

AIRBAG

CROSS REFERENCE TO RELATED APPLICATIONS

The Present application claims priority from Japanese Patent Application No. 2017-188202 of Nonoyama et al., filed on Sep. 28, 2017, and Japanese Patent Application No. 2018-145347 of Nonoyama et al., filed on Aug. 1, 2018, the entire disclosures of which are incorporated herein by reference.

BACKGROUND OF THE INVENTION

1. Field of the Invention

The present invention relates to an airbag adapted to be mounted on a vehicle, and more particularly, the invention relates to an airbag which internally includes a redirecting cloth for controlling a flow of an incoming inflation gas.

2. Description of Related Art

JP 2015-147528 A discloses an airbag that includes an airbag body and a redirecting cloth (or gas guide member) which is disposed inside the airbag body for controlling a flow of an incoming inflation gas. The redirecting cloth is disposed inside an inlet port (or connection port) of the airbag which is connected with an inflator, and includes an inlet section for connection with the inflator and two, front and rear outlet sections which are disposed at the front and rear portions of the lower region for releasing the inflation gas towards front and rear portions of the airbag body. The redirecting cloth is composed of a flexible sheet material that is folded in half and sewn up on the opposite outer peripheral edges such that the crease is disposed in an area extending from the upper edge of the inlet section to the upper edge of the front outlet section while seams of the sewing are disposed in an area extending from the lower edge of the inlet section to the upper edge of the rear outlet section and in an area forming lower edges of the front and rear outlet sections.

The seam sewing the lower edges of the front and rear outlet sections is formed merely by sewing up opposite raw edges of the sheet material. When an inflation gas flows through the redirecting cloth, the redirecting cloth turns to an inflated state in which opposing inner surfaces are separated from each other, from an original state in which the inner surfaces are in contact with each other. At this time, the inflation gas also hits the seam, i.e. sewing threads forming the seam, directly, and highly likely damages the threads. If the threads are broken, the inflation gas will leak from the broken portion and the function of the redirecting cloth will be hindered.

To address this problem, JP 1998-129380 A proposes protecting the seam from an inflation gas with a tape member, and JP 2012-091574 A proposes disposing an extended region of the material of the redirecting cloth over the seam. However, these measures complicate the production of the airbag.

SUMMARY OF THE INVENTION

An object of the present invention is to provide an airbag that is simple to construct, the seam or sew region of a redirecting cloth of which is configured to be unsusceptible to damage from inflation gas.

The airbag of the invention is adapted to be mounted on a vehicle and includes:
a body;
a redirecting cloth that is composed of a single sheet material having flexibility and disposed inside the body, the redirecting cloth including:
an inlet port for taking in an inflation gas;
one or more outlet ports that release the inflation gas as flown from the inlet port towards predetermined regions of the body; and
a sew region that sews first and second terminal edges of the sheet material together,
wherein each of the first and second terminal edges of the sheet material includes a turned-and-sewn region that has been turned inward and sewn, and at least a part of the sew region sews terminals of the turned-and-sewn regions together.

In the airbag of the invention, when an inflation gas flows into the redirecting cloth via the inlet port, the gas flows towards the sew region along inner surfaces of the redirecting cloth. However, edges of the turned-and-sewn regions are disposed in a vicinity of the sew region. The edges of the turned-and-sewn regions engage with the gas heading towards the sew region and prevent the gas from directly hitting and damaging the sewing threads of the sew region. This configuration to reduce damage on the sew region can be constructed merely by forming the turned-and sewn regions, i.e. turning up and sewing the opposite edges of the sheet material of the redirecting cloth, and sewing the turned-and sewn regions together, thus saves the trouble of covering the sew region with a tape member or layers of material of the redirecting cloth.

Therefore, the airbag of the invention has an improved heat resistance in the sew region of the redirecting cloth, and is simple to construct.

In the airbag of the invention, a sew seam of the turned-and-sewn region of the first terminal edge of the sheet material and a sew seam of the turned-and-sewn region of the second terminal edge of the sheet material may be displaced from each other.

With this configuration, since the sew seams of the turned-and-sewn regions are formed at different positions, a region of the redirecting cloth in a vicinity of the sew region is prevented from becoming bulky. Accordingly, the redirecting cloth can be laid flat easily and folded up easily together with the airbag body.

In the airbag of the invention, the redirecting cloth may include an additional outlet port (namely, a terminal outlet port), between the terminals of the turned-and-sewn regions.

This configuration will improve heat resistance of a peripheral region of the terminal outlet port, since the peripheral region of the terminal outlet port is composed of the opposite turned-and-sewn regions each of which has a double-wall structure. Accordingly, the terminal outlet port will have little fear of breakage of the peripheral region even when subjected to a hot inflation gas. It goes without saying that the edges of the turned-and-sewn regions as turned inward engage with an inflation gas heading towards the sew region and prevent the gas from directly hitting and damaging the sewing threads of the sew region in a vicinity of the terminal outlet port.

In the airbag of the invention, the turned-and-sewn region may be formed only at a portion of the sew region where heat resistance is required, or may be formed in an entire sew region sewing opposite terminal edges of the redirecting cloth.

The airbag of the invention may be configured as follows:

The redirecting cloth is formed by folding the sheet material in half on a crease and sewing resulting opposite peripheral edges together such that the inlet port and outlet port are formed. The resulting redirecting cloth includes a redirecting body; a root region that is tubular in contour and extends from the redirecting body; and a mouth region that is tubular in contour and bends and extends from an end of the root region. The outlet port and the sew region are disposed in the redirecting body, and the inlet port for receiving an inflator which emits the inflation gas is disposed at the end of the mouth region. The crease of the redirecting cloth forms edges of the root region and mouth region disposed apart from the redirecting body. A leading edge of the redirecting cloth, i.e. opposite edges of the sheet material as folded, which adjoins the crease and is disposed apart from the inlet port, is sewn up. An inner panel is disposed in an interior of the mouth region and root region of the redirecting cloth. The inner panel is formed by folding an inner-panel sheet material in half on a crease. A leading edge of the inner panel, i.e. opposite edges of the inner-panel sheet material as folded, which adjoins the crease and is disposed apart from the inlet port, is sewn together with the leading edge of the redirecting cloth. The crease of the inner panel is disposed proximate to and at an inner side of the crease of the redirecting cloth such that a gap is formed between the creases of the inner panel and the redirecting cloth at a vicinity of the leading edges of the inner panel and redirecting cloth, thus forming a portion which is composed of the sheet material of the redirecting cloth only. A sew seam that sews the leading edges of the inner panel and redirecting cloth together extends beyond the crease of the inner panel and continues to the portion composed of the sheet material of the redirecting cloth only.

With this configuration, the leading edge of the inner panel is completely sewn up by the sew seam, from the region apart from the crease to a posterior of the crease. Sewing threads of the sew seam surrounds the crease of the inner panel at the vicinity of the leading edge and the sew seam continues to the redirecting body, thus ensuring gas sealing property of the crease in the vicinity of the leading edge of the inner panel. This configuration will prevent an inflation gas from leaking from the leading edge of the inner panel and help forward the gas towards the redirecting body smoothly.

If the inner panel is disposed inside the redirecting cloth in such a manner that the creases of the inner panel and redirecting cloth are brought into close contact each other without a gap, it will not be possible to sew together edges of the inner panel and redirecting cloth to a posterior or exterior of the crease of the inner panel. In that instance, an unsewn region will be formed and permit gas leakage.

If the inner panel is regarded as an airbag member while the redirecting cloth as a patch member, a gas sealing property of a vicinity of the crease of the airbag member can be improved through the use of the patch member, as follows:

That is, the airbag member is composed of a sheet material having flexibility and inflatable with an inflation gas, and the airbag member includes:

a crease that folds the sheet material in half;
a pair of opposing walls that are disposed on opposite sides of the crease, the opposing walls separating from each other when the airbag member is inflated;
a patch member that has flexibility and is applied to an outer surface of at least one of the opposing walls so as to intersect with the crease;
a multiwall portion in which the opposing walls and the patch member overlap;
a simplex portion that adjoins the multiwall portion and is composed of the patch member only; and
a sew seam that sews outer circumferential edges of the opposing walls together, the sew seam extending across the multiwall portion and the simplex portion, beyond the crease.

With the aid of the patch member, the sew seam is able to sew together the outer circumferential edges of the airbag member completely. With this configuration, when the airbag member is inflated and the opposing walls separate from each other, the sewing threads which are spanned between stitching holes adjoining the crease surround or encompass the crease, such that a gas sealing property of the vicinity of the crease is ensured, and a gas leakage from the vicinity of the crease is prevented.

BRIEF DESCRIPTION OF DRAWINGS

In the drawings,

FIG. 8 illustrates a production process of the inner panel;

FIG. 11 depicts a front sheet material and a rear sheet material to be joined to a redirecting body of the redirecting cloth;

FIG. 12 illustrates a process of joining the front sheet material and rear sheet material to the redirecting body of the redirecting cloth;

FIG. 14 illustrates a process of assembling an outer panel and a cover panel;

FIG. 15 illustrates a process of joining the outer panel as assembled with the cover panel to a main inflatable region to form an outer module of the airbag;

FIG. 17 illustrates a process of producing the airbag by assembling the inner module and outer module;

FIGS. 20 and 21 illustrates another modification of the redirecting cloth and a production process of the same;

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
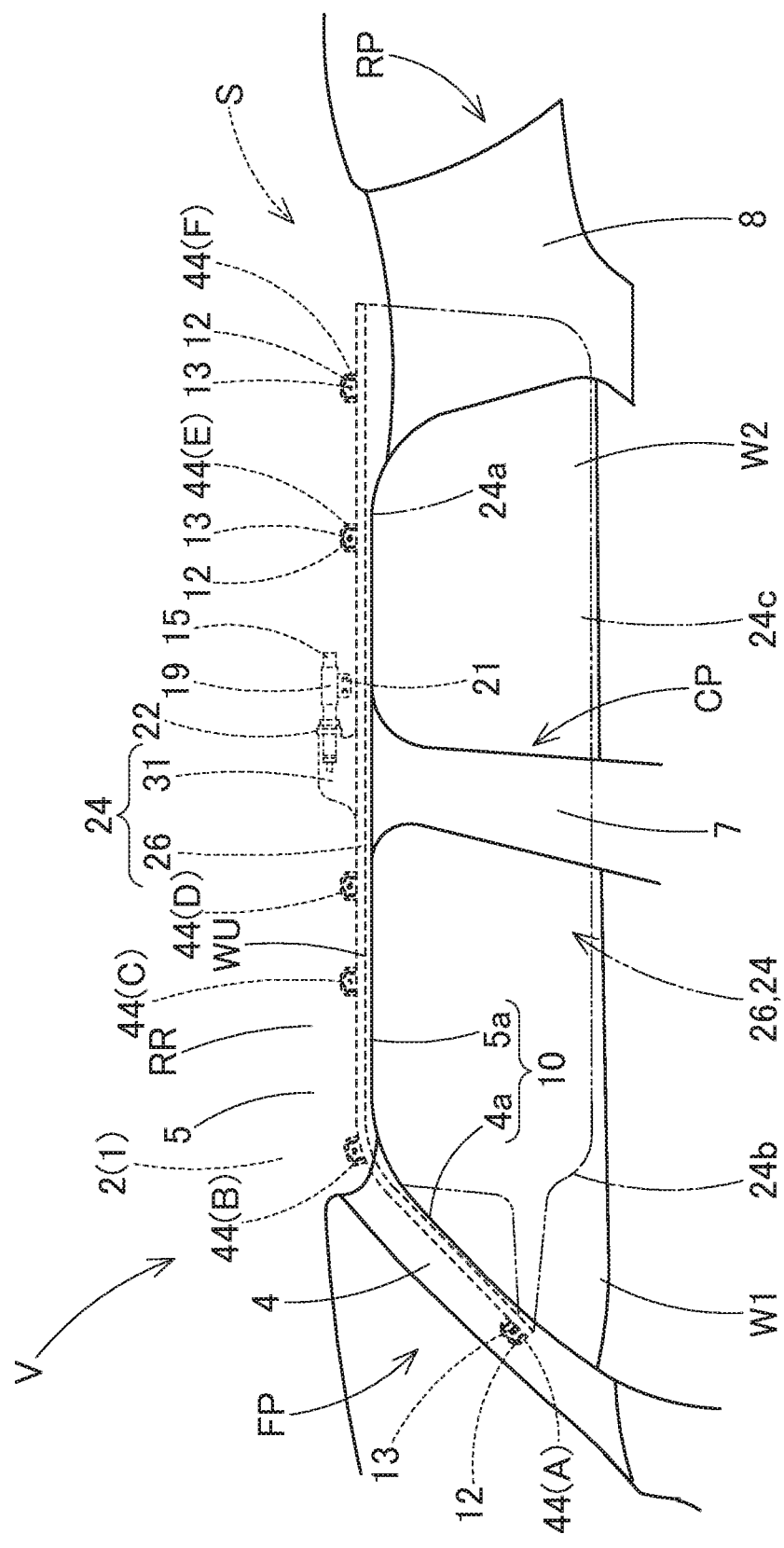
FIG. 1 is a front elevation of a head-protecting airbag device as mounted on a vehicle, viewed from an interior of a vehicle. The airbag device employs an airbag embodying the invention.

An airbag 24 embodying the invention is described as employed in a head-protecting airbag device S as shown in FIG. 1. Other than the head-protecting airbag or curtain airbag 24, the airbag device S includes an inflator 15 for feeding an inflation gas to the airbag 24, an airbag cover 10, a mounting bracket 19 and a plurality of mounting brackets 12. The airbag 24 is stored in a folded-up configuration in upper peripheries WU of windows (side windows) W1 and W2 of a vehicle V, which windows being disposed one behind the other at a side of a front seat and a rear seat inside the vehicle V. That is, the airbag 24 is stored extendedly in a lower peripheral region of a front pillar FP to a region above a rear pillar RP, via a region above a middle pillar CP.

Figure 2:
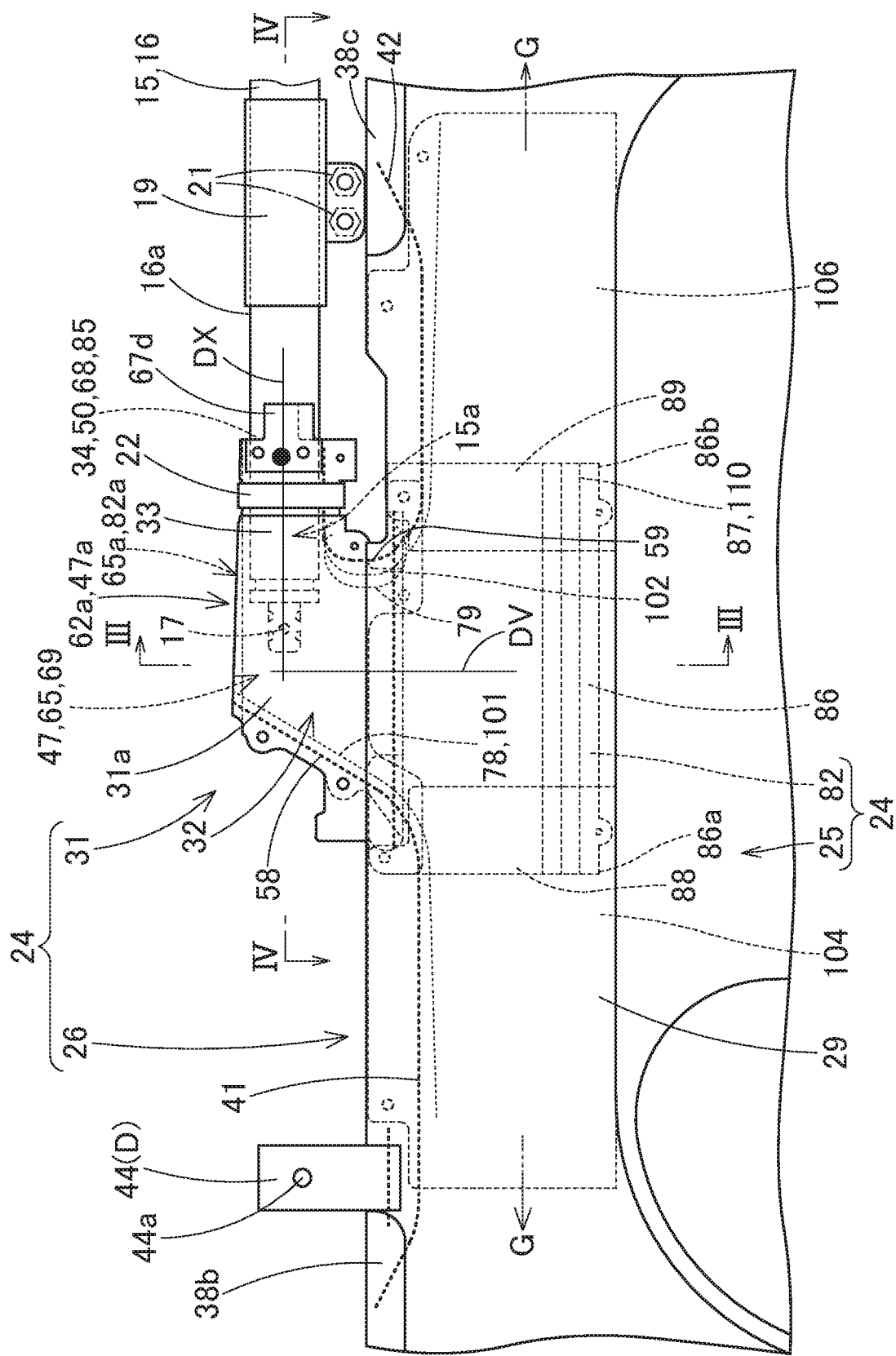
FIG. 2 is an enlarged front elevation of a vicinity of an inlet port of the airbag.
Figure 3:
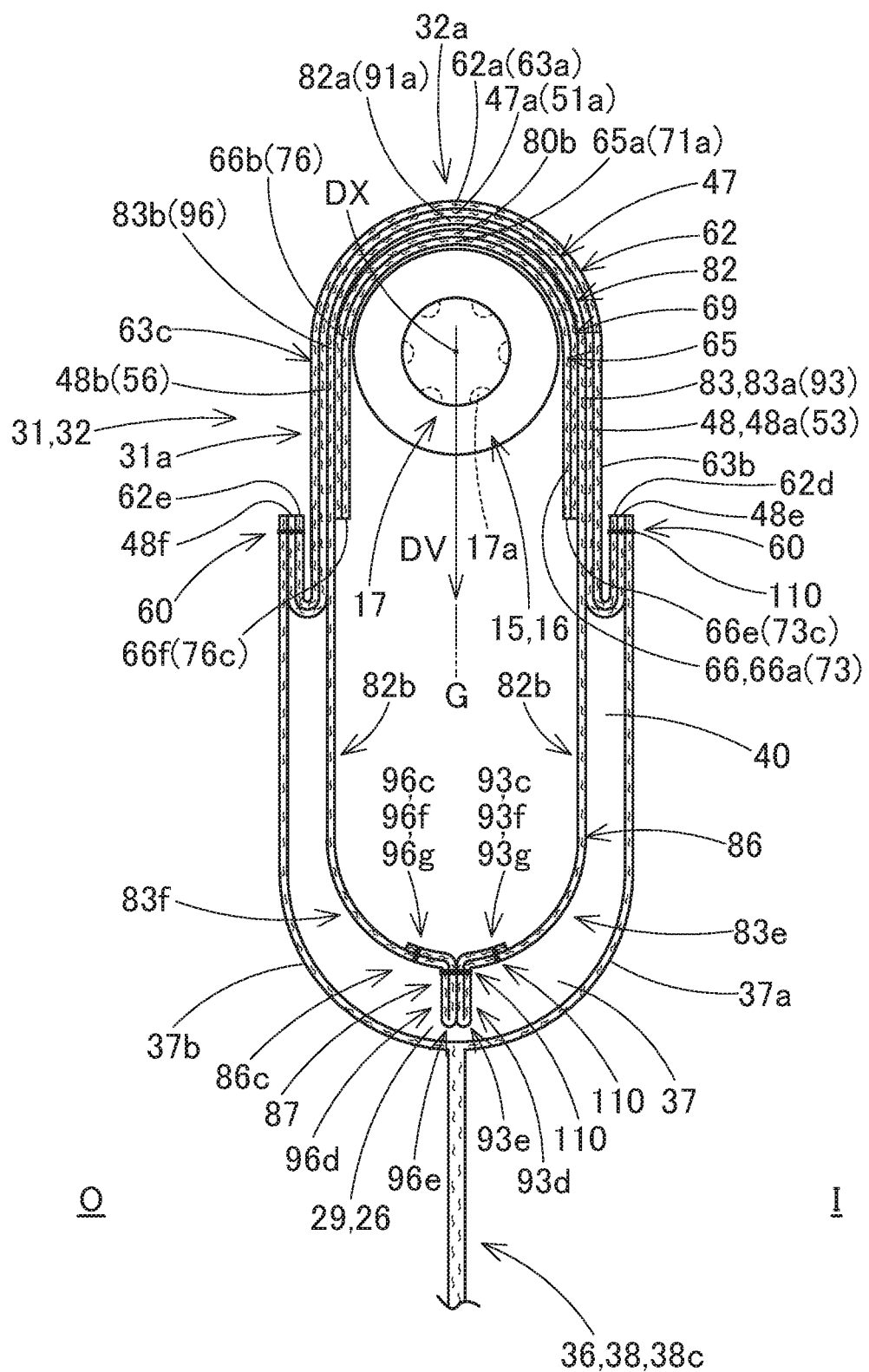
FIG. 3 is a schematic vertical sectional view of the airbag as connected with an inflator, taken along line III-III of FIG. 2.
Figure 4:
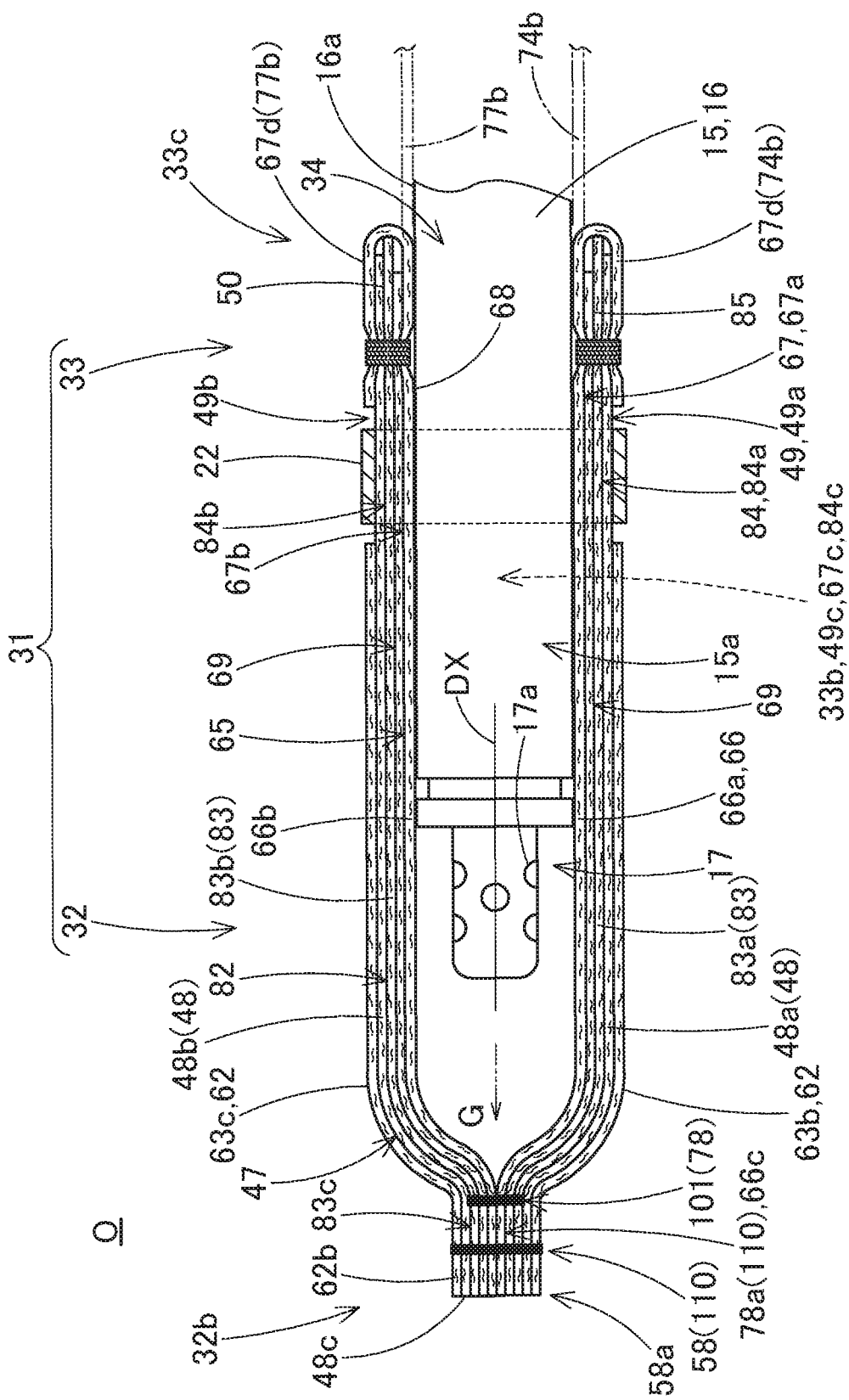
FIG. 4 is a schematic horizontal sectional view of the airbag as connected with an inflator, taken along line IV-IV of FIG. 2.

As shown in FIGS. 2 to 4, the inflator 15 is cylindrical in outer contour, and is inserted into a later-described mouth region 33 of an inlet port section 31 of the airbag 24, thus joined with the airbag 24. The inflator 15 contains a combustible gas-generating agent to generate an inflation gas G, and includes an ignition device, a cylindrical main body 16 and a gas releasing portion 17 disposed at the leading end of the main body 16. The gas releasing portion 17 is smaller in diameter than the main body 16 and provided with a plurality of gas discharge ports 17a for releasing the gas G when the airbag device S is actuated.

The inflator 15 is secured to an inner panel 2 at a roof side rail RR located in a vicinity of an upper region of the middle pillar CP with the mounting bracket 19, as shown in FIGS. 1 and 2. The mounting bracket 19 is mounted around an outer circumference 16a of a root region of the main body 16 of the inflator 15 in a clamping fashion, and is bolt 21 fixed to the inner panel 2. The inflator 15 is covered with a lower rim 5a of a roof head liner 5 (FIG. 1). The leading end 15a of the inflator 15 including the gas releasing portion 17 is inserted into the later-described mouth region 33 of the inlet port section 31 of the airbag 24, and the mouth region 33 is pressed against the inflator 15 by a clamp (connecting means) 22. Thus the inflator 15 is connected with the mouth region 33.

The inflator 15 is actuated by a suitable control device which can detect a side impact or an oblique collision including an offset collision of the vehicle V.

As shown in FIG. 1, the mounting brackets 12 are used to mount later-described mounting portions 44 (44A to 44F) of the airbag 24 on the inner panel 2 in cooperation with mounting bolts 13. Each of the bolts 13 is fastened into a screw hole on the inner panel 2 provided with a nut or the like.

As shown in FIG. 1, the airbag cover 10 is composed of a lower rim 4a of a front pillar garnish 4 arranged on the front pillar FP and the lower rim 5a of the roof head liner 5 arranged on the roof side rail RR.

Figure 5:
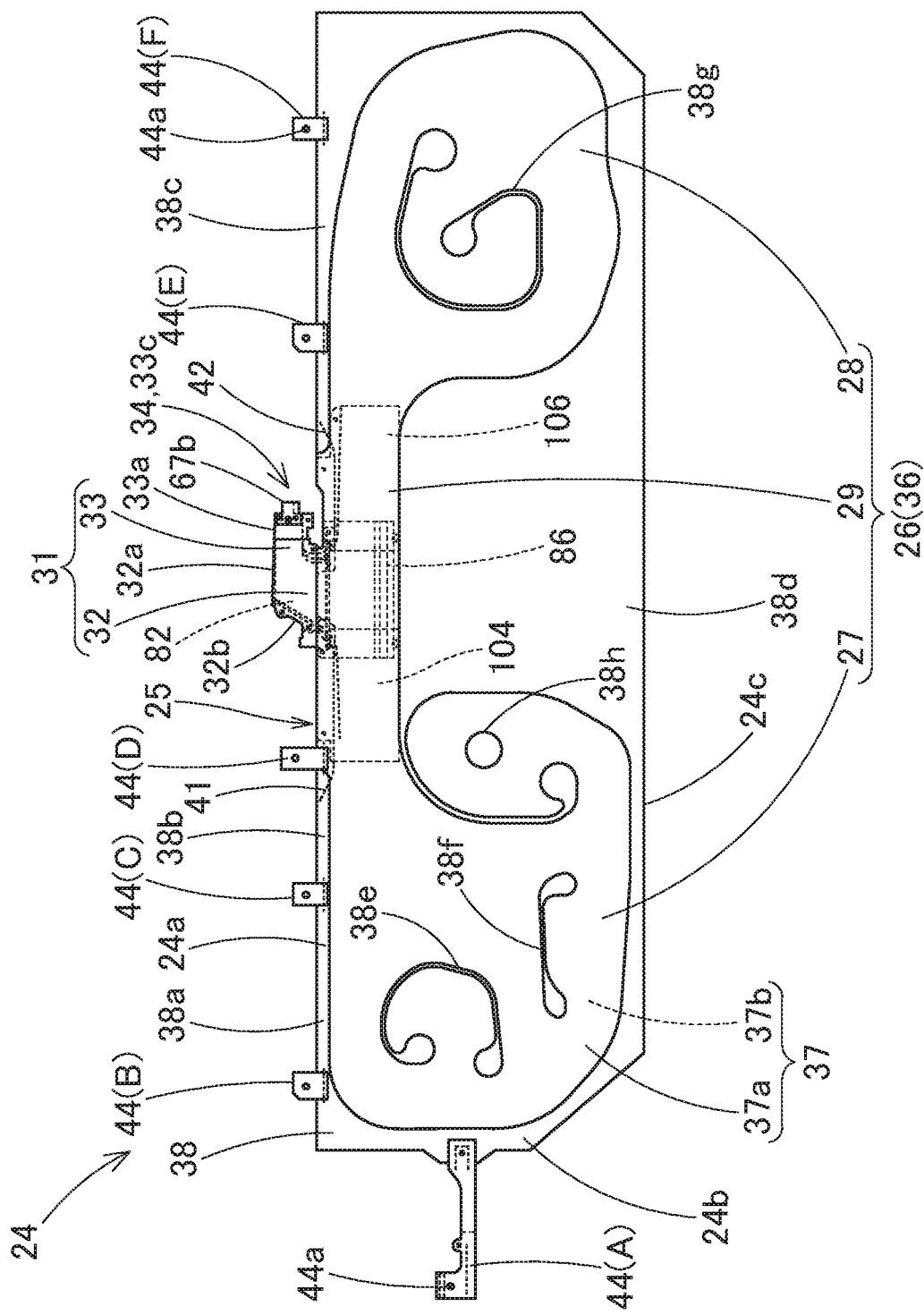
FIG. 5 is a front elevation of the airbag embodying the invention.

As shown in FIGS. 2 to 4, the airbag 24 includes a bag body 25 and a redirecting cloth 82 disposed inside the bag body 25. As can be seen in FIGS. 1 and 5, the bag body 25 includes a main inflatable region 26 which is inflatable with an inflation gas G and an inlet port section 31 which protrudes upward from the main inflatable region 26 for taking in the inflation gas G fed from the inflator 15. The redirecting cloth 82 is disposed inside the bag body 25 in an area extending across the inlet port section 31 and a region of the main inflatable region 26 in a vicinity of the inlet port section 31.

The main inflatable region 26 is formed by one-piece woven technology and inflatable into a generally rectangular board shape. The main inflatable region 26 includes a front inflatable portion 27 deployable over the window W1, a rear inflatable portion 28 deployable over the window W2, and a communicating region 29 which is arranged along the upper edge 24a of the airbag 24 and provides a communication between the front inflatable portion 27 and rear inflatable portion 28. The inlet port section 31 protrudes upward from a vicinity of the center in a front and rear direction of the communicating region 29.

The main inflatable region 26 is provided, in the upper edge 24a and front edge 24b, with a plurality of (six, in the illustrated embodiment) mounting portions 44 (44A to 44F) of various shapes that are used to mount the airbag 24 at the peripheries of the windows W1 and W2. Each of the mounting portions 44 is provided with a mounting hole 44a for receiving the mounting bolt 13, and mated with the mounting bracket 12 for mounting on the inner panel 2. The mounting portions 44 are secured to the inner panel 2 by fastening the mounting bolts 13 into screw holes of the inner panel 2, as described above.

Figure 6:
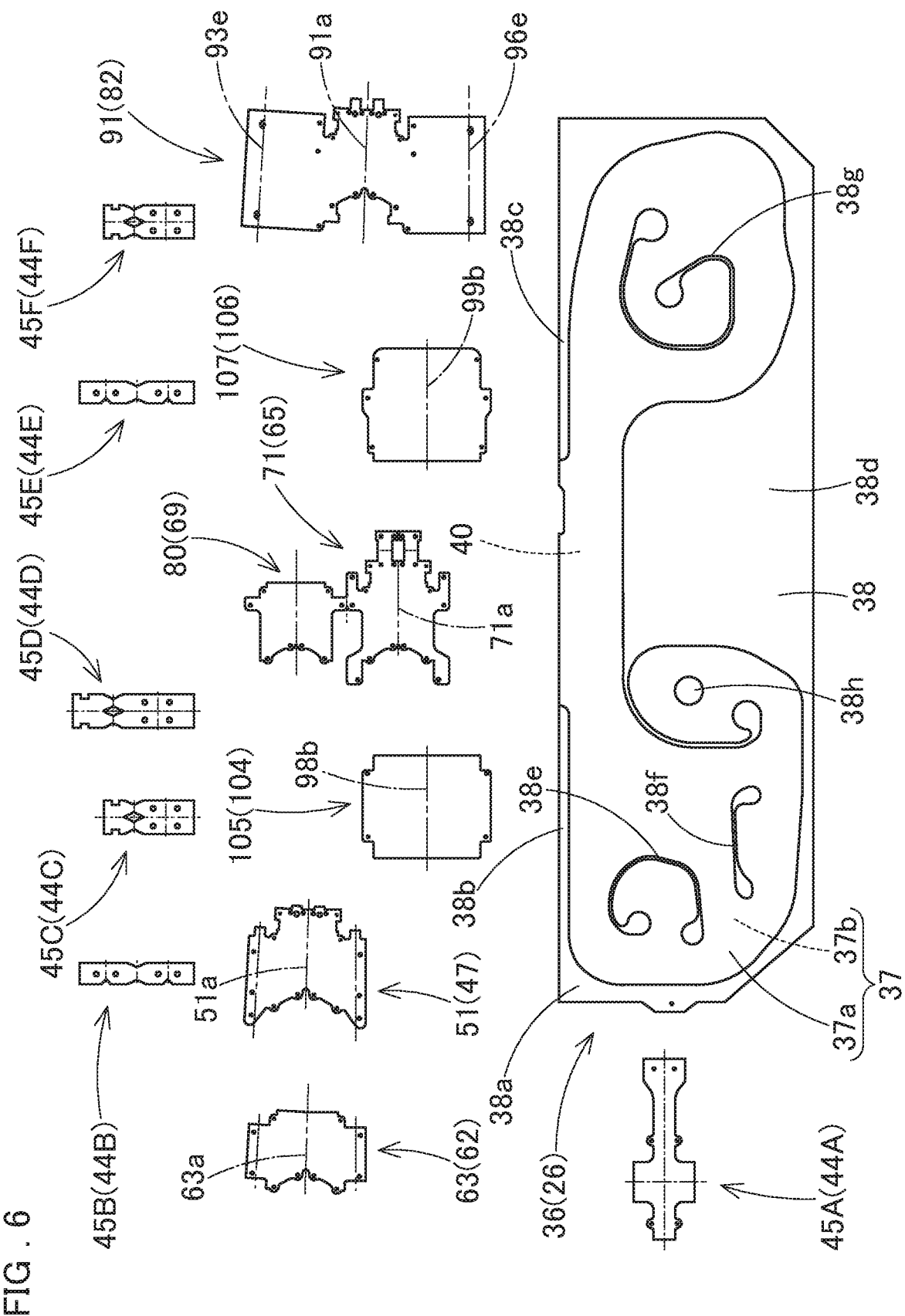
FIG. 6 depicts components of the airbag of FIG. 5 by front views.

In the illustrated embodiment, as shown in FIGS. 5 and 6, the main inflatable region 26 is composed of a one-piece woven portion 36 which is formed by one-piece woven technology with yarns of polyamide or the like. The one-piece woven portion 36 includes an inflatable region 37 which is inflatable in such a manner as to separate an inboard side wall 37a from an outboard side wall 37b, and a closed region (or uninflatable region) 38 in which the inboard side wall 37a and the outboard side wall 37b are attached together so as not to let the inflation gas G in between the walls 37a and 37b, as shown in FIG. 3. The closed region 38 includes a peripheral closed portion 38a disposed in a periphery of the inflatable region 37, a central closed portion 38d which extends upward from a lower region of the peripheral closed portion 38a, partitions the front inflatable portion 27 from the rear inflatable portion 28, and defines the lower edge of the communicating region 29, linear closed portions 38e, 38f and 38g and a round closed portion 38h which are disposed inside the front inflatable portion 27 or rear inflatable portion 28. The one-piece woven portion 36 further includes an opening 40 in a vicinity of the center in a front and rear direction of the upper edge of the inflatable region 37 where no peripheral closed portion 38a is not disposed. As described later, an outer wall 31a (an outer panel 47 and a cover panel 62) of the inlet port section 31 is sewn to the periphery of the opening 40 such that the inlet port section 31 protrudes from the main inflatable region 26, as shown in FIG. 3.

As can be seen in FIG. 6, components of the airbag 24 of the illustrated embodiment includes, other than the one-piece woven portion 36 for forming the main inflatable region 26, sheet materials 45A to 45F for forming the mounting portions 44A to 44F, an outer-panel sheet material 51, a cover-panel sheet material 63, an inner-panel sheet material 71, a front sheet material 105, a rear sheet material 107, a sheet material 91 for forming the redirecting cloth 82. The outer-panel sheet material 51, the cover-panel sheet material 63, and the inner-panel sheet material 71 form the inlet port section 31, as described later. The sheet materials 45, 51, 63, 71, 91, 105 and 107 are formed of a fabric woven with yarns of polyamide or the like. Round apertures formed in the outer edge of each of the sheet materials 45, 51, 63, 71, 91, 105 and 107 are positioning holes for each receiving a positioning pin (not shown) for preventing slippage between the sheet materials.

As can be seen in FIGS. 2 to 4, the inlet port section 31 includes a root region 32 which protrudes upward from a vicinity of the center in a front and rear direction of the upper edge of the main inflatable region 26 and a mouth region 33 which extends transversely (towards the rear, in the illustrated embodiment) from the leading end or upper end of the root region 32 and includes an opening 34 at the terminal (at the rear end, in the illustrated embodiment) for receiving the leading end 15a region of the inflator 15, thus having a generally L shape. An axial direction DX of the mouth region 33 is parallel to the communicating region 29 of the main inflatable region 26. The root region 32 covers a vicinity of the gas releasing portion 17 of the inflator 15 as inserted into the mouth region 33, and guides an inflation gas exiting the gas releasing portion 17 downwardly, i.e. in a direction DV perpendicular to the mouth region 33, such that the gas G flows into the communicating region 29 of the main inflatable region 26.

The inlet port section 31 includes an outer panel 47 which adjoins the outer surface of the main inflatable region 26 (outer surfaces of the inboard side wall 37a and outboard side wall 37b), an inner panel 65 which is disposed inside the outer panel 47, and the redirecting cloth 82 which is disposed between the outer panel 47 and inner panel 48. The inlet port section 31 of the illustrated embodiment further includes, on an outside of the outer panel 47, a cover panel 62 which protects the outer panel 47 from surrounding members when mounted on board.

Referring to FIGS. 3, 4, 6, 14 to 17, the outer panel 47 includes a root region 48 forming the root region 32 of the inlet port section 31 and a mouth region 49 forming the mouth region 33 of the inlet port section 31. The outer panel 47 is formed by folding the outer-panel sheet material 51 in half on a crease 51a. The crease 51a forms a far-side edge (i.e. an upper edge) 47a of the outer panel 47 (i.e. far-side edges or upper edges of the root region 48 and mouth region 49) disposed away from the main inflatable region 26.

The outer-panel sheet material 51 includes, on both sides of the crease 51a, an inboard side region 52 deployable on the inboard side and an outboard side region 55 deployable on the outboard side. As can be seen in FIG. 14, each of the inboard side region 52 and outboard side region 55 includes a root-forming region 53/56 which forms the root region 32 (root region 48) of the outer panel 47, and a mouth-forming region 54/57 which forms the mouth region 33 (mouth region 49) of the outer panel 47. The root-forming regions 53 and 56 are sewn together by the leading edges (front edges) 53a and 56a, which adjoins the crease 51a and is disposed apart from the mouth-forming regions 54 and 57, with a sew seam 58 (FIGS. 4 and 16), and by the root edges (rear edges) 53b and 56b, which are disposed in a vicinity of the mouth-forming regions 54 and 57, with a sew seam 59 (FIGS. 2, 16, 17 and 18). The seam 59 also sews the lower edges 54a and 57a of the mouth-forming regions 54 and 57 together in a vicinity of the root-forming regions 53 and 56.

Folding the outer-panel sheet material 51 and forming the seams 58 and 59 provide the outer panel 47 having the root region 48 and mouth region 49. A region between the crease 51a and seam 59 serves as an opening 50 for receiving the inflator 15.

The outer panel 47 is joined to the periphery of the opening 40 of the one-piece woven portion 36 (more particularly, to the inboard side wall 37a and outboard side wall 37b of the one-piece woven portion 36) by lower edges 48e and 48f (i.e. lower edges 53c and 56c of the sheet material 51) of an inboard side region 48a and an outboard side region 48b of the root region 48 with a seam 60 (FIGS. 3 and 15).

In the illustrated embodiment, the outer panel 47 is covered by the cover panel 62, as described above. The cover panel 62 is composed of the cover-panel sheet material 63 which is folded in half on a crease 63a and disposed over the outer-panel sheet material 51 such that an inboard side region 63b and an outboard side region 63c, which are disposed on both sides of the crease 63a, each cover the inboard side region 52 and outboard side region 53 of the outer-panel sheet material 51, as shown in FIGS. 3, 4, 14 to 17. The cover panel 62 is joined to the outer panel 47 with the seams 58 and 59 described above.

The cover panel 62 is also joined to the periphery of the opening 40 of the one-piece woven portion 36 (i.e. to the inboard side wall 37a and outboard side wall 37b of the one-piece woven portion 36) by lower edges 62d and 62e together with the lower edges 48e and 48f of the root region 48 of the outer panel 47 with the seam 60.

The lower edges 62d and 62e of the cover panel 62 and lower edges 48e and 48f of the root region 48 of the outer panel 47 are sewn to the periphery of the opening 40 of the one-piece woven portion 36 with the seam 60 before the seams 58 and 59 are formed.

Figure 16:
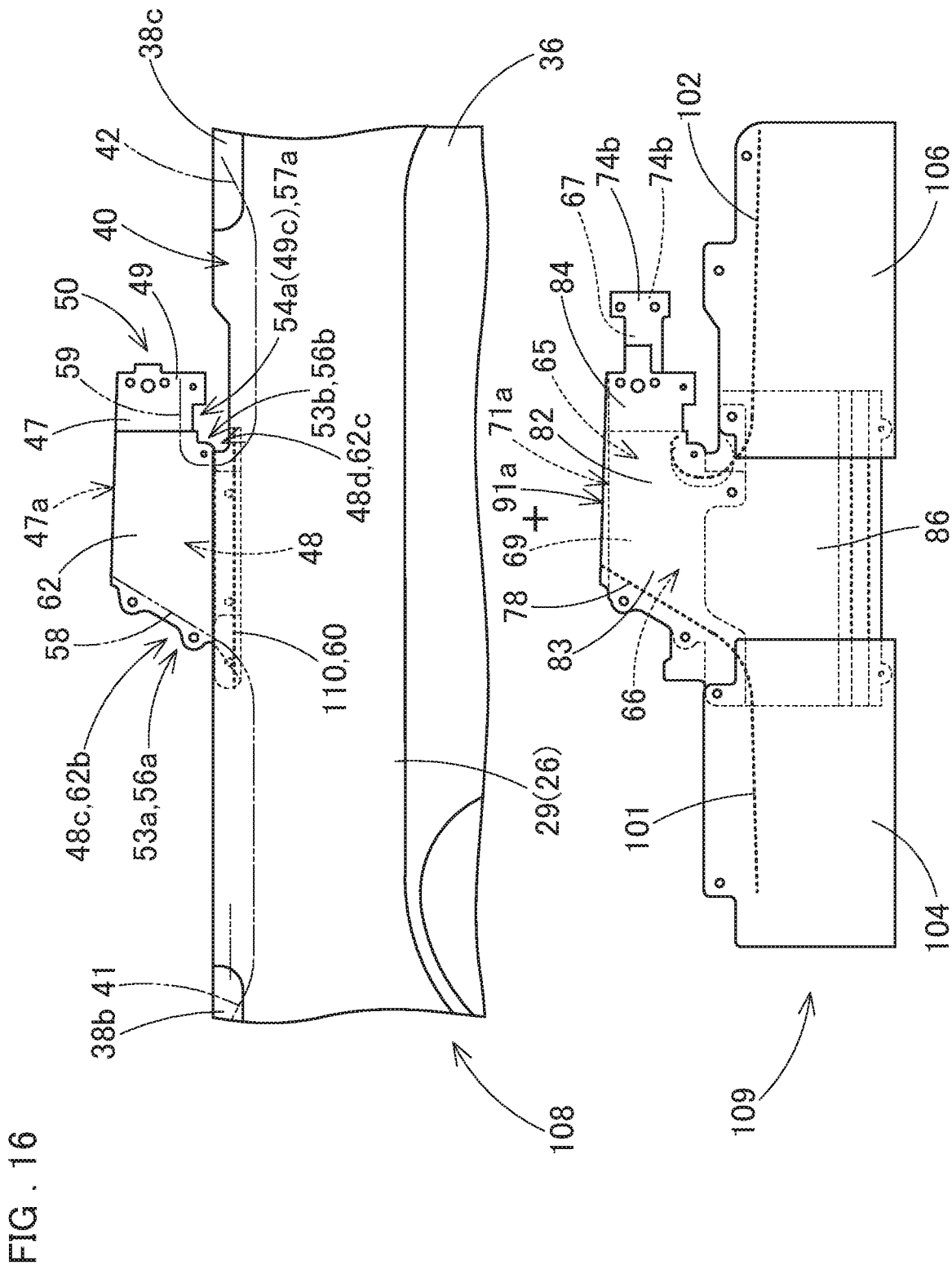
FIG. 16 depicts the outer module and inner module of the airbag by front elevations.

In the illustrated embodiment, as can be seen in FIGS. 2, 16 and 17, the seams 58 and 59 are respectively integral with later-described seams 41 and 42 that close off front and rear regions of the opening 40 of the one-piece woven portion 36. The front seam 41 sews the inboard side wall 37a and outboard side wall 37b of the one-piece woven portion 36 together at the front region of the opening 40, and a rear end portion of the front seam 41 is composed of the seam 58 and sews the front edges (leading edges) 48c and 62d of the outer panel 47 and cover panel 62. The rear seam 42 sews the inboard side wall 37a and outboard side wall 37b of the one-piece woven portion 36 together at the rear region of the opening 40, and a front end portion of the rear seam 42 is composed of the seam 59 and sews the rear edges (root edges) 48d and 62c of the outer panel 47 and cover panel 62. The seam 59 sews the lower edges 49c of an inboard side region 49a and an outboard side region 49b of the mouth region 49 of the outer panel 47 as well together, including the cover panel 62.

Referring to FIGS. 3, 4, 6 to 8, the inner panel 65 includes a root region 66 forming the root region 32 of the inlet port section 31 and a mouth region 67 forming the mouth region 33 of the inlet port section 31. The inner panel 65 is formed by folding the inner-panel sheet material 71 in half on a crease 71a. The crease 71a forms a far-side edge (i.e. an upper edge) 65a of the inner panel 65 (i.e. far-side edges or upper edges of the root region 66 and mouth region 67) disposed away from the main inflatable region 26.

Figure 7:
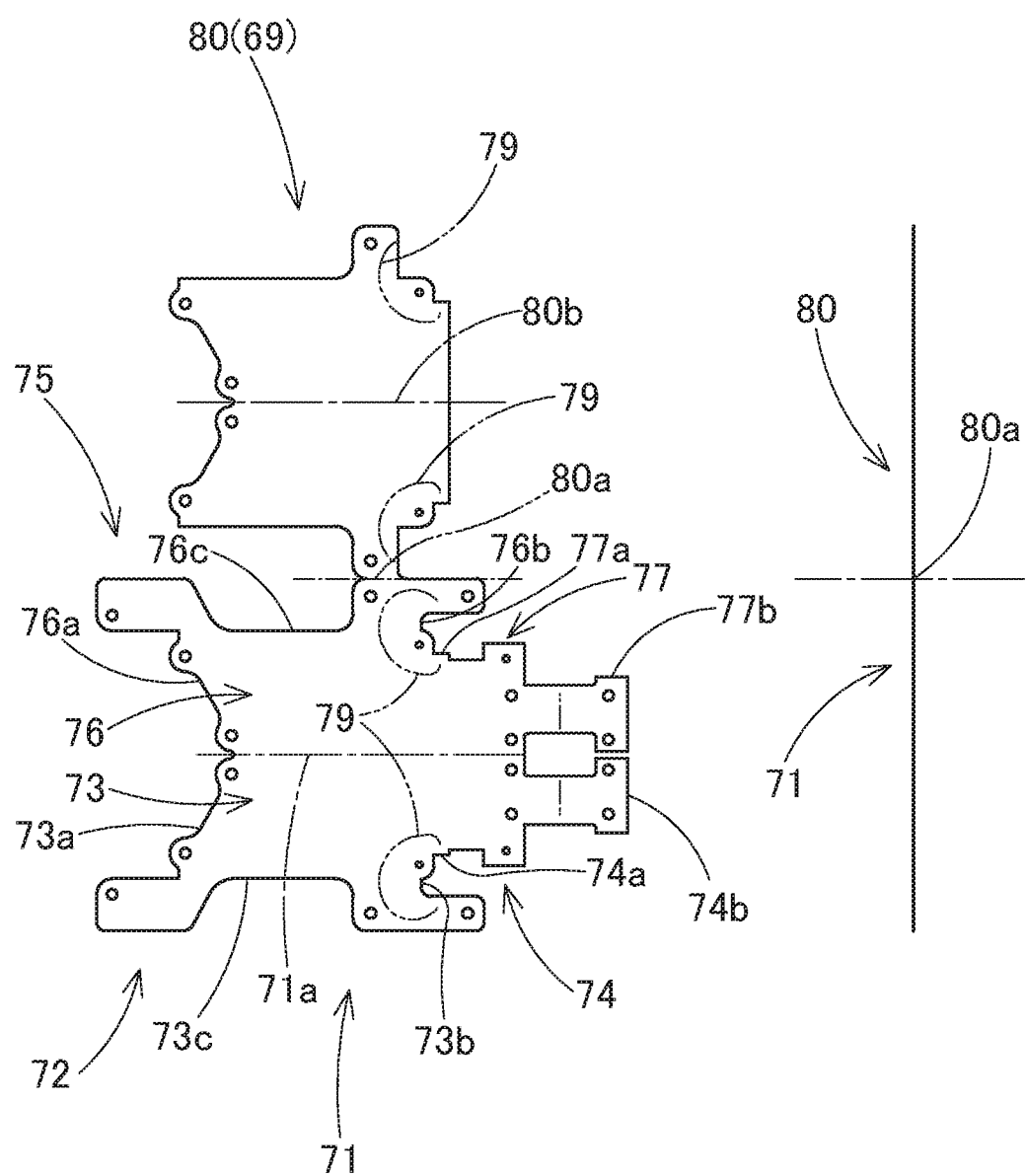
FIG. 7 is a plan view of an inner-panel sheet material for forming an inner panel for use in the airbag of FIG. 5.

The inner-panel sheet material 71 includes, on both sides of the crease 71a, an inboard side region 72 deployable on the inboard side and an outboard side region 75 deployable on the outboard side. As can be seen in FIGS. 7 and 8, each of the inboard side region 72 and outboard side region 75 includes a root-forming region 73/76 which forms the root region 32 (root region 66) of the inner panel 65, and a mouth-forming region 74/77 which forms the mouth region 33 (mouth region 67) of the inner panel 65. The root-forming regions 73 and 76 are sewn together by the leading edges (front edges) 73a and 76a which adjoin the crease 71a and are disposed apart from the mouth-forming regions 74 and 77, with a sew seam 78 (FIGS. 2, 4 and 13), and by the root edges (rear edges) 73b and 76b which are disposed in a vicinity of the mouth-forming regions 74 and 77, with a sew seam 79 (FIGS. 2, 7 and 8). The seam 79 also sews the lower edges 74a and 77a of the mouth-forming regions 74 and 77 together in a vicinity of the root-forming regions 73 and 76.

Folding the inner-panel sheet material 71 and forming the seams 78 and 79 provide the inner panel 65 having the root region 66 and mouth region 67. A region between the crease 71a and seam 79 serves as an opening 68 for receiving the inflator 15.

In the illustrated embodiment, the seam 78 also serves as a sew seam 101 that sews together front edges 93a and 96a of the sheet material 91 for forming the redirecting sheet 92 as described later.

As can be seen in FIGS. 3, 4, 6 to 8, the inner-panel sheet material 71 further includes an extended region 80 for forming a reinforcing panel 69 which is disposed over an outer side of the inner panel 65 for enhancing heat resistance of the inlet port section 31. The extended region 80 is folded over the inboard side region 72 and outboard side region 75 on a boundary line 80a before forming the seams 78 and 79, and sewn up together with the seams 78 and 79. Thus the reinforcing panel 69 is disposed over outer sides of the root region 66 and mouth region 67 of the inner panel 65. That is, the extended region 80 is also folded in half on a crease 80b which overlaps with the crease 71a.

The inner-panel sheet material 71 further includes a tab-forming region 74b, 77b each in the mouth-forming regions 74 and 77. As shown in FIG. 4 and (B) and (C) of FIG. 17, each of the tab-forming regions 74b and 77b forms a tab 67d for finger gripping for enlarging the opening 34 of the inlet port section 31 such that the inflator 15 is inserted smoothly. Specifically, the tab-forming regions 74b and 77b are folded back on the outer surface of a portion proximate to the opening 50 of the mouth region 49 of the outer panel 47 and each welded to the inboard side region 49a and outboard side region 49b of the outer panel 47. Thus the tabs 67d are formed.

Referring to FIGS. 3, 4, 6, 9 to 13, the redirecting cloth 82 includes a root region 83 disposed in the root region 32 of the inlet port section 31, a mouth region 84 disposed in the mouth region 33 of the inlet port section 31, and a redirecting body 86 extending from the lower edge 83e, 83f of the root region 83 to be disposed inside the communicating region 29 of the main inflatable region 26. The redirecting cloth 82 is formed by folding the sheet material 91 in half on a crease 91a. The crease 91a forms a far-side edge (i.e. an upper edge) 82a of the redirecting cloth 82 (i.e. far-side edges or upper edges of the root region 83 and mouth region 84) disposed away from the main inflatable region 26.

Figure 9:
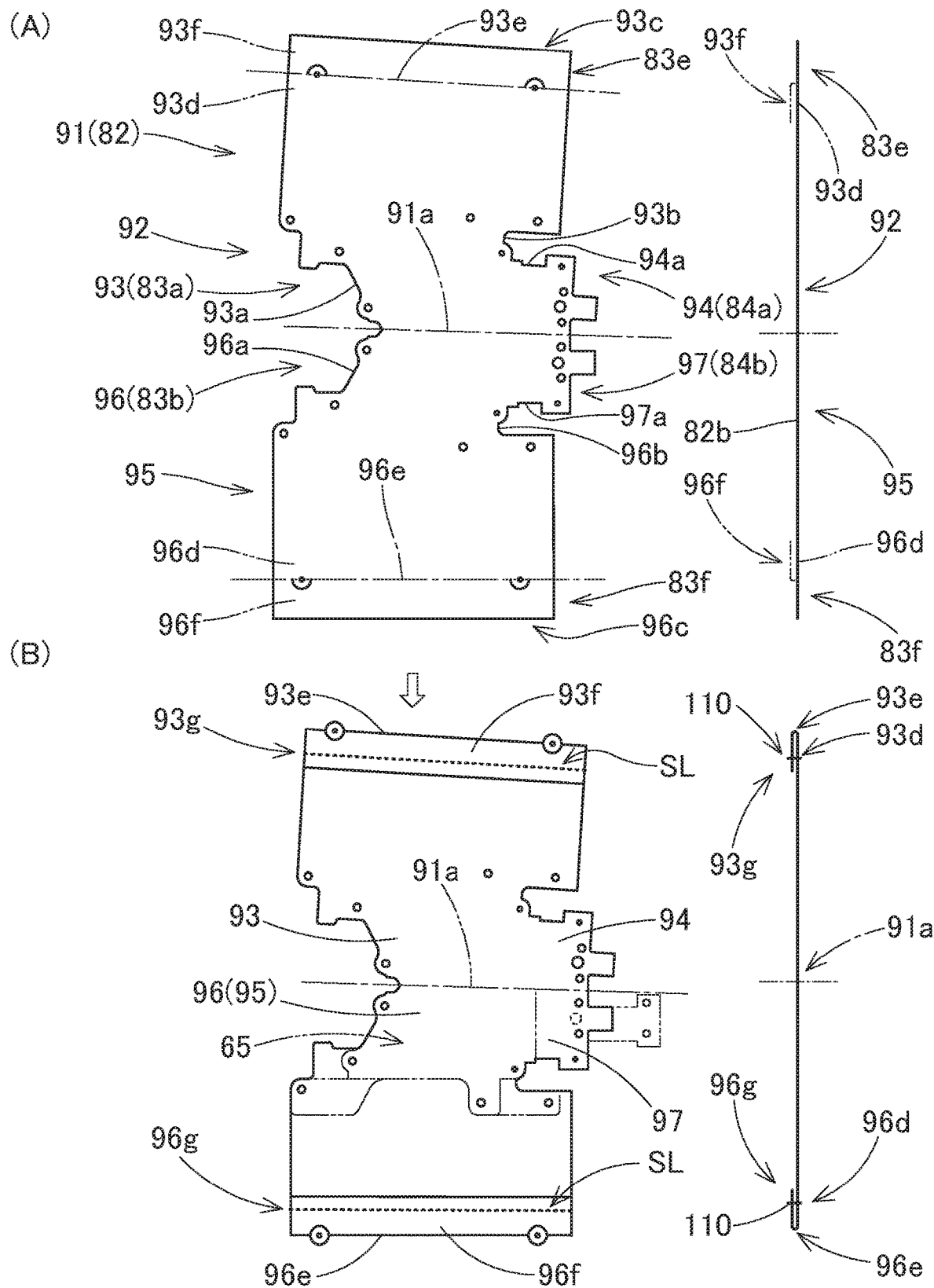
FIG. 9 illustrates a part of a production process of a redirecting cloth.
Figure 10:
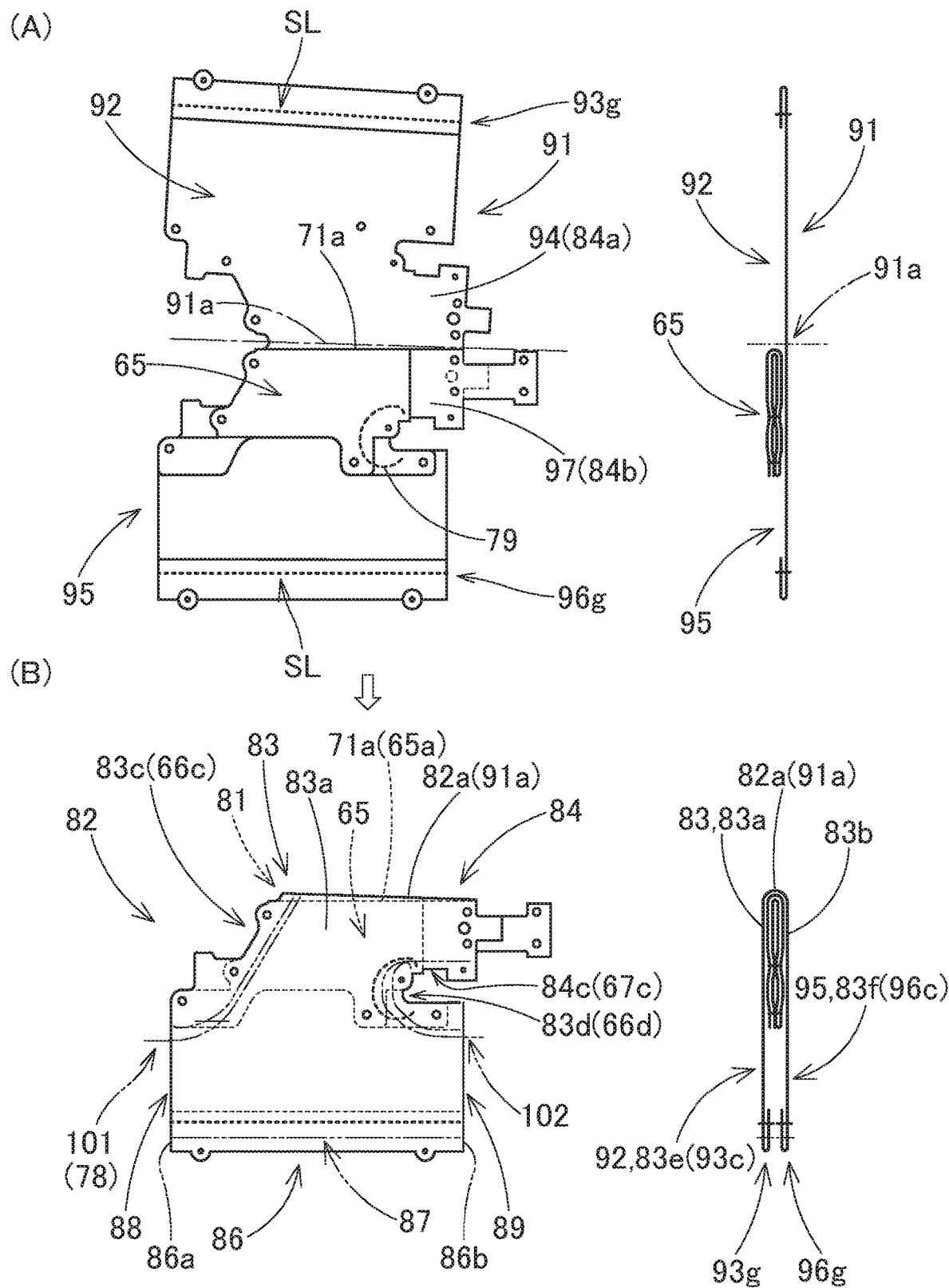
FIG. 10 illustrates a process of assembling the inner panel and redirecting cloth.
Figure 13:
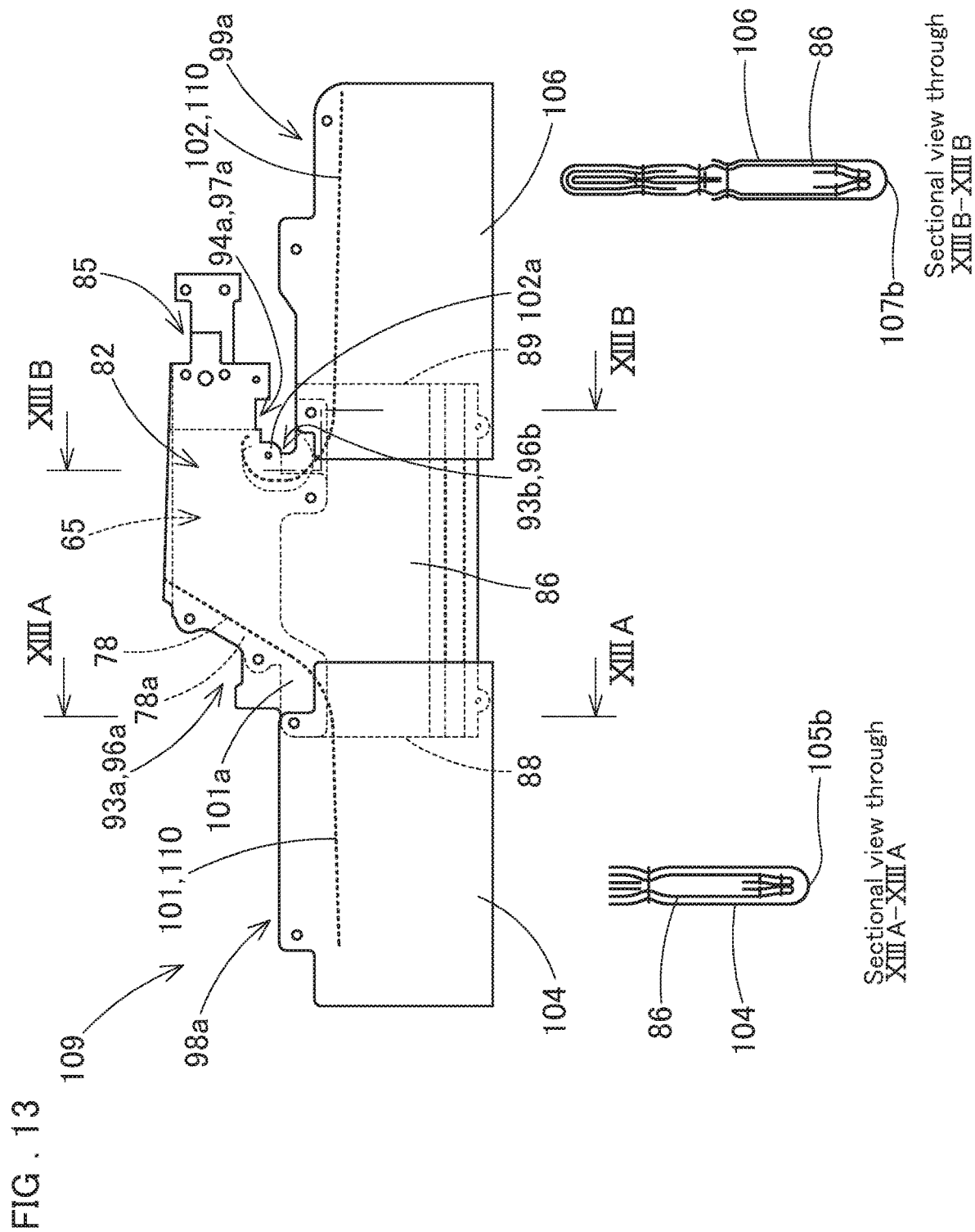
FIG. 13 is a front elevation of an inner module of the airbag which is formed by sewing the inner panel and redirecting cloth together.

The sheet material 91 includes, on both sides of the crease 91a, an inboard side region 92 deployable on the inboard side and an outboard side region 95 deployable on the outboard side, as shown in FIGS. 9 and 10. Each of the inboard side region 92 and outboard side region 95 includes a root-forming region 93/96 which forms the root region 32 (root region 83) of the redirecting cloth 82, and a mouth-forming region 94/97 which forms the mouth region 33 (mouth region 84) of the redirecting cloth 82. The root-forming regions 93 and 96 are sewn together by the leading edges (front edges) 93a and 96a which adjoins the crease 91a and are disposed apart from the mouth-forming regions 94 and 97, with a sew seam 101 (FIGS. 4 and 13), and by the root edges (rear edges) 93b and 96b which are disposed in a vicinity of the mouth-forming regions 94 and 97, with a sew seam 102 (FIG. 13). The seam 102 also sews the lower edges 94a and 97a of the mouth-forming regions 94 and 97 together in a vicinity of the root-forming regions 93 and 96. Further, the edges 93c and 96c of the inboard side region 92 and outboard side region 95 located away from the crease 91a are sewn together with a seam (sew region) 87.

Folding the sheet material 91 and forming the seams 101, 102 and 87 provide the redirecting cloth 82 having the root region 83, the mouth region 84 and the redirecting body 86. A region between the seams 87 and 101 serves as a front outlet port 88 for releasing an inflation gas towards the front, and a region between the seams 87 and 102 serves as a rear outlet port 89 for releasing an inflation gas towards the rear. A region between the crease 91a and seam 102 serves as an opening for receiving the inflator 15, i.e. an inlet port 85 of the redirecting cloth 82.

As shown in FIGS. 2, 3, 5 and 13, the redirecting body 86 surrounded by the seams 87, 101 and 102 extends from the inlet port section 31 into the communicating region 29 of the main inflatable region 26. The redirecting body 86 is formed into a tube extending in a front and rear direction so as to bifurcate an inflation gas as passed through the mouth region 84 and root region 83 towards the front and rear in the communicating region 29. As shown in FIGS. 3 and 10, the sheet material 91 has such a shape that each of lower edge 83e and 83f regions of an inboard side region 83a and an outboard side region 83b of the root region 83 (in other words, the edge 93c and 96c regions of the sheet material 91) is lengthened, and the opposite terminal edges 93c and 96c are sewn together with the seam 87, thus forming the redirecting body 86.

More specifically, the seam (sew region) 87 of the redirecting body 86 is formed as follows: As shown in FIGS. 9 to 11, each of the terminal edges 93c and 96c of the sheet material 91 (i.e. the lower edges 83e and 83f of the redirecting cloth 82) is firstly folded or turned inward on a crease 93e/96e extending in a front and rear direction. The turned regions 93f and 96f are respectively sewn to opposing regions 93d and 96d by sew seams SL extending in the front and rear direction, thereby forming turned-and-sewn regions 93g and 96g. The turned-and-sewn regions 93g and 96g are then sewn together by the seam 87 composed of sewing threads 110. The seam 87 is formed at a position farther towards the terminal (towards the creases 93e and 96e) than the sew seams SL.

Furthermore, as shown in FIGS. 11 to 13, in the illustrated embodiment, a front tube 104 and a rear tube 106 are respectively attached to peripheries of the front outlet port 86a and rear outlet port 86b of the redirecting body 86 of the redirecting cloth 82 so as to guide an inflation gas G farther. Each of the front tube 104 and rear tube 106 is composed of the front sheet material 105/rear sheet material 107. Each of the front sheet material 105 and rear sheet material 107 is folded in half on a crease 105b/107b and so arranged as to wrap the periphery of the front outlet port 86a and rear outlet port 86b of the redirecting body 86, and sewn up by the upper edges 105a/107a with the seams 101 and 102 together with the sheet material 91. Thus the front tube 104 and rear tube 106 are formed.

Although the crease 91a of the redirecting cloth 82 is a straight line extending along a front and rear direction similarly to the crease 71a of the inner panel 65, it is so slanted as to be separated from the crease 71a in a vicinity of the leading edge (front edge) 83c of the root region 83, as shown in (B) of FIG. 10 and in (A) of FIG. 26. A gap 81 formed between the crease 71a and crease 91a enhances a gas sealing property of a vicinity of the crease 71a of the inner panel 65. More specifically, as shown in (B) of FIG. 26, the sew seam 78 (or sew seam 101), which sews together the leading edges (front edges) 73a and 76a of the root-forming regions 73 and 76 of the inner-panel sheet material 71 and the leading edges (front edges) 93a and 96a of the root-forming regions 93 and 96 of the sheet material 91, includes a multi-object region 111 that sews the inner panel 65 and redirecting cloth 82 together and a single-object region 112 that is disposed at a portion beyond the crease 71a and sews the redirecting cloth 82 only. In a boundary 113 between the multi-object region 111 and single-object region 112 of the seam 78, which is composed of lockstitch, an upper thread 115 and a lower thread 116 forming a stitch that bridges across the boundary 113, i.e. that is spanned between the stitching holes 114A and 114B closest to the boundary 113, surround or encompass the crease 71a, such that the inner surfaces of an inboard side wall 66a and an outboard side wall 66b are brought into close contact with each other, and a gas sealing property of the crease 71a is ensured.

Production of the airbag 24 is now described. Referring to FIGS. 7 and 8, firstly, the inner-panel sheet material 71 is folded on the boundary line 80a such that the extended region 80 is disposed over the outer side of the crease 71a, and then folded in half again on the creases 71a and 80b. Then the rear edges 66d of the root region 66 as mated are sewn together with the sewing threads 110 to form the seam 79. The inner panel 65 is thus formed. Unless otherwise specified, all stitches referred to in this specification including the seam 79 are composed of lockstitch. The sewing thread 110 is composed of a multifilament of such synthetic resin as polyamide.

In the meantime, as shown in FIG. 9, the turned-and-sewn regions 93g and 96g are respectively formed in the terminal edges 93c and 96c of the inboard side region 92 and outboard side region 95 (i.e. in the lower edges 83e and 83f of the root region 83) of the sheet material 91 for forming the redirecting cloth 82 by turning and sewing the terminal edges 93c and 96c. Then as shown in FIG. 10, the inner panel 65 is placed on the outboard side region 95 of the sheet material 91 as laid flat such that the crease 71a of the inner-panel sheet material 71 and the crease 91a of the sheet material 91 are disposed at the far-side edges 65a and 82a of the inner panel 65 and the redirecting cloth 82, and such that the creases 91a and 71a are out of alignment and a gap 81 is formed between the crease 91a and crease 71a in the vicinity of the front edge 83c. The sheet material 91 is then folded in half on the crease 91a, and the turned-and-sewn regions 93g and 96g are sewn together by with sewing threads 110 as shown in (A) of FIG. 11, thus forming the seam (sew region) 87. Thus the redirecting body 86 is formed in the redirecting cloth 82.

Thereafter, as shown in FIGS. 12 and 13, the front sheet material 105 and rear sheet material 107 are respectively folded in half on the creases 105b and 107b and respectively disposed over the front outlet port 86a and rear outlet port 86b of the redirecting body 86. The upper edge 105a of the front sheet material 105 and front edges 93a and 96a of the redirecting cloth 82 are sewn together with the seam 101 (i.e. seam 78) of the sewing threads 110 while the upper edge 107a of the rear sheet material 107 and rear edges 93b and 96b of the redirecting cloth 82 are sewn together with the seam 102 of the sewing threads 110. Thus the redirecting cloth 82 as well as an inner module 109 of the airbag 24, which internally includes the inner panel 65, is formed.

As described above, the seam 78 (i.e. seam 101) includes the multi-object region 111 that sews the inner panel 65 and redirecting cloth 82 together and the single-object region 112 that is disposed at the portion beyond the crease 71a and sews the redirecting cloth 82 only. When this seam 78 is formed, the upper thread 115 and the lower thread 116 forming the stitch that bridges across the boundary 113 between the multi-object region 111 and single-object region 112, i.e. that is disposed between the stitching holes 114A and 114B closest to the boundary 113, surround or encompass the crease 71a, as can be seen in FIG. 26B. Further, although not shown in the drawings, the seam 78 includes a backstitch at the terminal for preventing the seam 78 from raveling. More specifically, after the seam 78 has been formed from the upper edge 105a of the front sheet material 105 to the region beyond the crease 71a via the front edges 93a and 96a of the sheet material 91 in a rising fashion, the backstitch is made for a suitable length.

In the meantime, an outer module 108 of the airbag 24 is formed. Referring to FIG. 14, the cover-panel sheet material 63 is disposed over the outer-panel sheet material 51 for forming the outer panel 47 such that the creases 51a and 63a overlap each other. Then as shown in FIG. 15, the cover-panel sheet material 63 and outer-panel sheet material 51 are folded in half together on the creases 51a and 63a, and the lower edges 48e and 62d and the lower edges 48f and 62e are each folded upward together. Then the lower edges 48e and 62d are sewn to an inner surface of the inboard side wall 37a in the periphery of the opening 40 of the one-piece woven portion 36 while the lower edges 48f and 62e are sewn to an inner surface of the outboard side wall 37b in the periphery of the opening 40 of the one-piece woven portion 36, by the seam 60. Thus the outer module 108 is formed as shown in FIG. 16.

Subsequently, as shown in FIG. 16 and (A) of FIG. 17, the inner module 109 is put into the outer module 110 through the use of the opening 40 of the one-piece woven portion 36 such that the redirecting body 86 of the redirecting cloth 82 is disposed inside the communicating region 29 of the main inflatable region 26, the creases 71a and 91a are disposed inside the crease 51a, and the root regions 66 and 83 and mouth regions 67 and 84 of the inner panel 65 and redirecting cloth 82 are respectively disposed inside the root region 48 and mouth region 49 of the outer panel 47. Then as shown in (B) and (C) of FIG. 17, in order to close off the opening 40, the inboard side wall 37a and outboard side wall 37b in the periphery of the opening 40 are sewn together with the front seam 41 and rear seam 42. At this time, the seam 58 forming the rear end portion of the front seam 41 sews the front edges 48c and 62d of the outer panel 47 and cover panel 62 together, and the seam 59 forming the front end portion of the rear seam 42 sews the rear edges 48d and 62c of the outer panel 47 and cover panel 62 together as well as the lower edges 49c of the mouth region 49 of the outer panel 47. Thus the inlet port section 31, which protrudes upward from the main inflatable region 26, is formed.

To describe a positional relationship among the creases 51a, 71a and 91a in detail, the crease 91a of the redirecting cloth 82 closely adjoins the crease 51a of the outer panel 47, and the crease 71a of the inner panel 65, the outer surface of which is closely covered with the reinforcing panel 69, is disposed inside the crease 91a with the gap 81 formed in the vicinity of the front edge 48c.

In the illustrated embodiment, the seams 58 and 59 not only sew the outer panel 47 and cover panel 62 together, but also sew front edges 66c, 83c and rear edges 66d, 83d and lower edges 67c, 84c of the inner panel 65 and redirecting cloth 82 together, as shown in FIGS. 4, 8 and 10. The seams 58 and 59 are each disposed on the outside of the seam 101 (78) that sews the front edges 66c and 83c of the inner panel 65 and redirecting cloth 82 together and the seams 79 and 102 that sew the rear edges 66d, 83d and lower edges 67c, 84c of the inner panel 65 and redirecting cloth 82 together, as shown in FIGS. 2 and 4.

When the inner module 109 is disposed inside the outer module 108, the tab-forming regions 74b and 77b of the inner panel 65 are respectively folded back on the outer surfaces of the inboard side region 49a and outboard side region 49b of the mouth region 49 of the outer panel 47, and welded thereto. The tabs 67d are thus formed, as shown in FIG. 4 and (B) and (C) of FIG. 17. Thereafter, the sheet materials 45A to 45F are attached to the upper edge 24a and front edge 24b of the airbag 24, thus forming the mounting portions 44A to 44F. The airbag 24 is thus completed.

When the airbag 24 is completed, the airbag 24 is folded up in such a fashion that the lower edge 24c is brought close to the upper edge 24a, and is bound with a breakable tape (not shown) for keeping a folded-up configuration. The mounting brackets 12 are then attached to the mounting portions 44. The leading end 15a region of the inflator 15 is inserted into the opening 34 of the mouth region 33 of the inlet port section 31 until it reaches the root region 32, and the clamp 22 is mounted around the inlet port section 31 to joint the inflator 15 with the inlet port section 31. Thus an airbag module is completed.

Thereafter, the mounting portions 44 with the mounting brackets 12 are disposed at mounting positions on the inner panel 2 of the vehicle body structure 1, and bolt 13 fastened thereat. Further, the inflator 15 is secured to the inner panel 2 by fixing the mounting bracket 19 with the bolts 21, and is connected to not-shown lead wires extending from a suitable control for actuating the inflator. If then the front pillar garnish 4, the roof head liner 5, a middle pillar garnish 7 and a rear pillar garnish 8 are attached to the vehicle body structure 1, the head-protecting airbag device S is mounted on the vehicle V.

When the head-protecting airbag device S as mounted on the vehicle V is actuated, the inflator 15 discharges an inflation gas G via the gas discharge ports 17a of the gas releasing portion 17 and the gas G flows into the main inflatable region 26 of the airbag 24 via the root region 32 of the inlet port section 31. Then the airbag 24 as inflated pushes and opens the airbag cover 10 and is deployed over the windows W1, W2, the middle pillar CP and the rear pillar RP, as indicated by double-dotted lines in FIG. 1.

Figure 18:
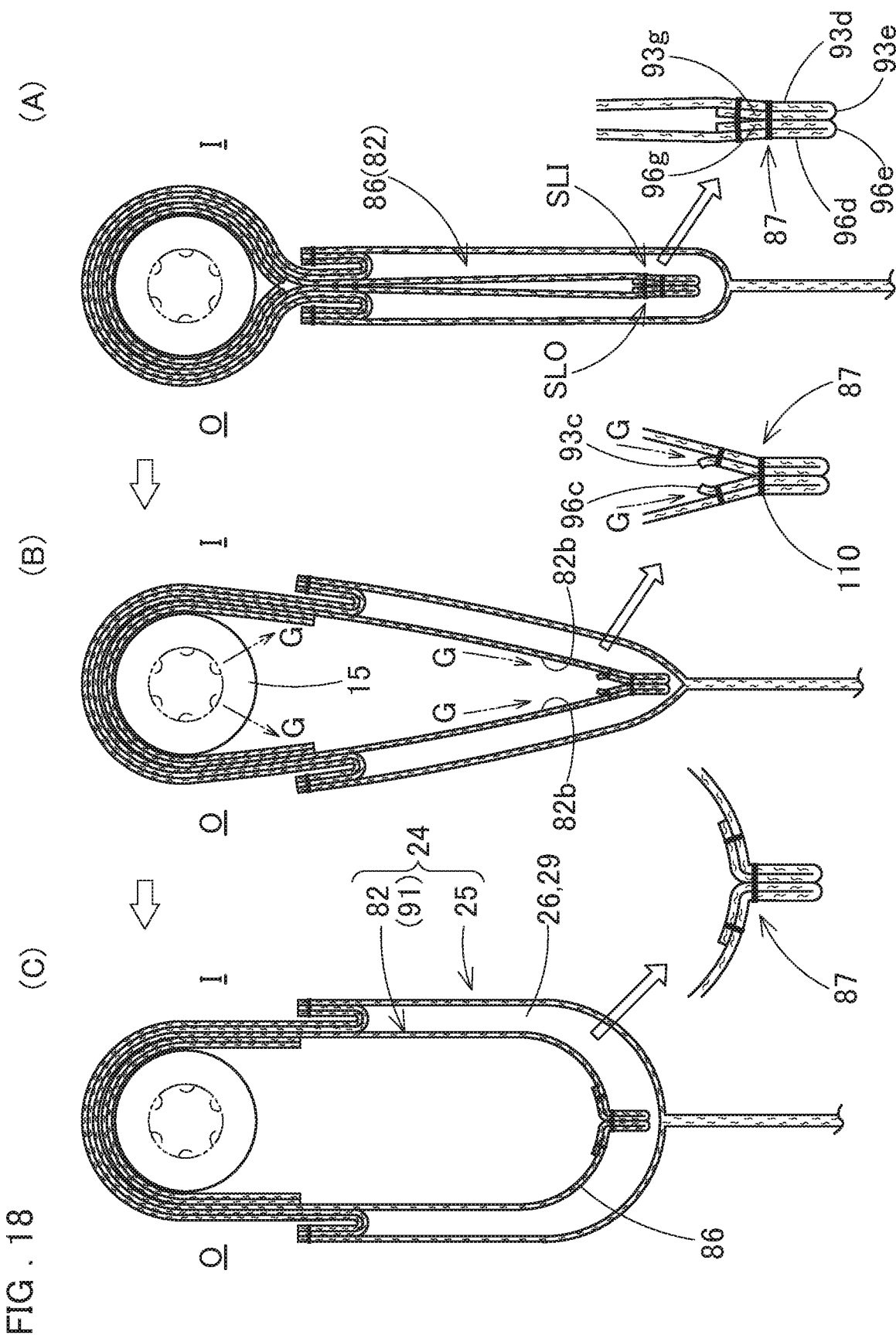
FIG. 18 illustrates the way an inflation gas flows into the redirecting cloth by vertical sectional views.

In the airbag 24 of the illustrated embodiment, more specifically, when the inflation gas G flows into the redirecting cloth 82 via the inlet port 85, as can be seen in (A) and (B) of FIG. 18, the gas G flows towards the seam (sew region) 87 along inner surfaces 82b of the redirecting cloth 82. However, in a vicinity of the seam 87 on the inner surfaces 82b, the edges 93c and 96c of the sheet material 91 of the redirecting cloth 82, which have been folded inward, are disposed. The edges 93c and 96c engage with the gas G heading towards the seam 87 and prevent the gas G from directly hitting and damaging the sewing threads 110 forming the seam 87. This configuration to reduce damage on the seam 87 can be constructed merely by forming the turned-and sewn regions 93g and 96g, i.e. turning and sewing the edges 93c and 96c, and sewing the turned-and sewn regions 93g and 96g together. That is, the airbag 24 of the illustrate embodiment is simple to construct, saves the trouble of covering the seam 87 with a tape member or layers of material of the redirecting cloth, and has an improved heat resistance of the sew region 87.

Therefore, with the airbag 24 of the illustrated embodiment, the seam 87 of the redirecting cloth 82 is prevented from damages from an inflation gas with a simple configuration.

Figure 19:
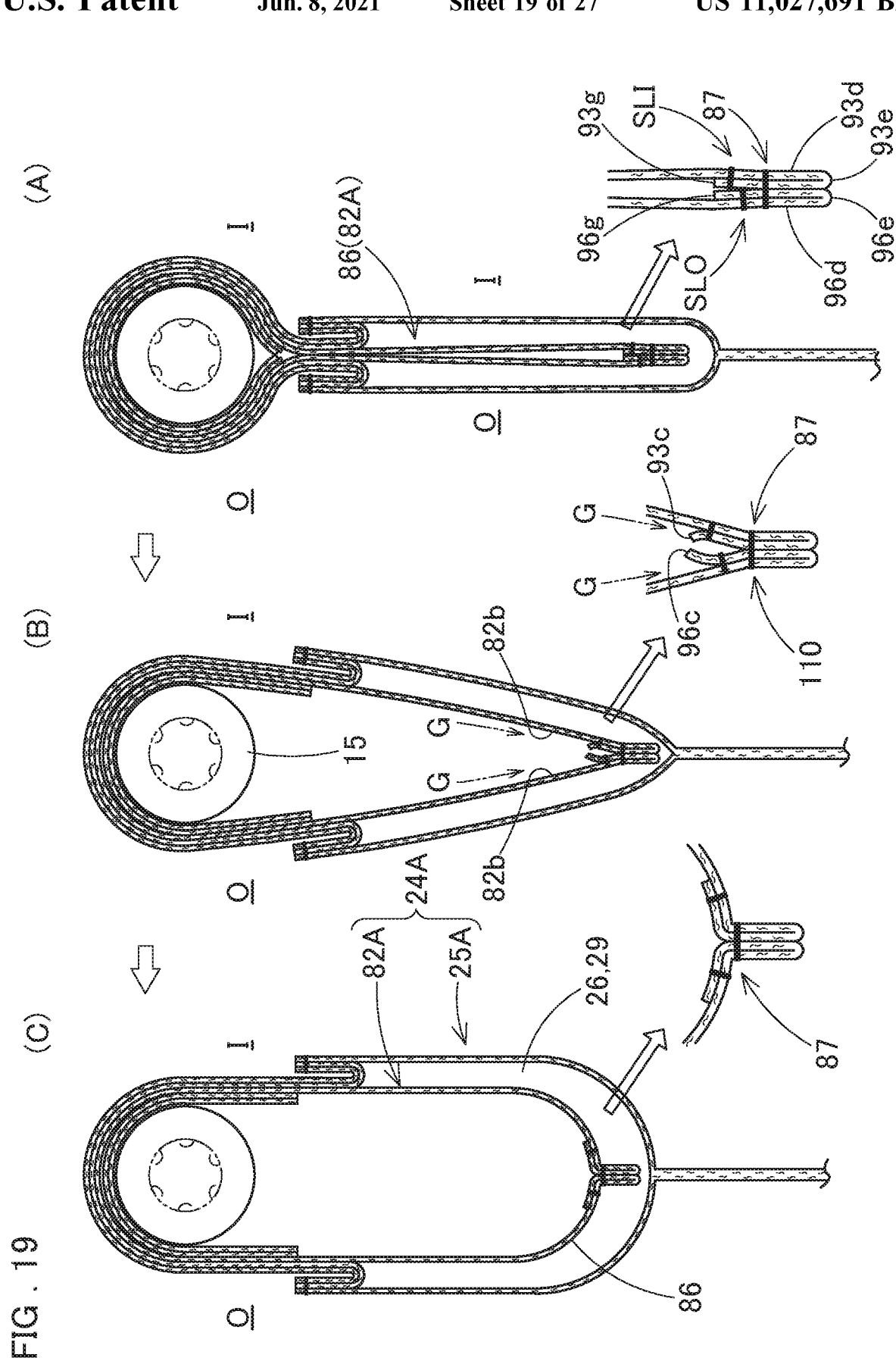
FIG. 19 illustrates a modification of the redirecting cloth by vertical sectional views.

In the illustrated embodiment, the sew seams SLI and SLO (FIG. 18) forming the opposite turned-and sewn regions 93g and 96g are formed at the same distances from the terminals (creases) 93e and 96e. However, as in a redirecting cloth 82A of an airbag 24A shown in FIG. 19, it is also conceivable that a sew seam SLI forming a turned-and sewn region 93g and a sew seam SLO forming an opposite turned-and sewn region 96g are formed at different distances from the terminals (creases) 93e and 96e.

With such an airbag 24A, since the sew seams SLI and SLO of the turned-and-sewn regions 93g and 96g are displaced from each other, a region of the redirecting cloth 82A in a vicinity of the seam 87 is prevented from becoming bulky. Accordingly, the redirecting cloth 82A can be laid flat easily and folded up easily together with a bag body 25A.

In the airbag 24A, the sew seam SLI of the turned-and-sewn region 93g is formed at a higher position, i.e. at a greater distance from the terminals 93e and 96e, than the sewn seam SLO of the turn-and-sewn region 96g. However, the sew seams SLI and SLO may be configured in an opposite manner.

In the airbag 24 of the foregoing embodiment, the redirecting cloth 82 has the outlet ports 88 and 89 at the front and rear in order to release the inflation gas G towards the front and rear (i.e. towards the front inflatable portion 27 and rear inflatable portion 28) in the communicating region 29 of the main inflatable region 26 of the bag body 25. Alternatively, the redirecting cloth may be configured like 82B in a bag body 25B of an airbag 24B shown in FIGS. 20 to 23. The redirecting cloth 82B further includes a terminal outlet port 90 between terminals 93k and 96k of turned-and-sewn regions 93n and 96n for releasing an inflation gas G towards a not-shown inflatable region of the bag body 25B disposed beneath there. Each of the turned-and-sewn regions 93n and 96n is formed by folding or turning a peripheral region 93i/96i of the terminal outlet port 90 and sewing the peripheral region 93i/96i with sewing threads 110.

Figure 20:
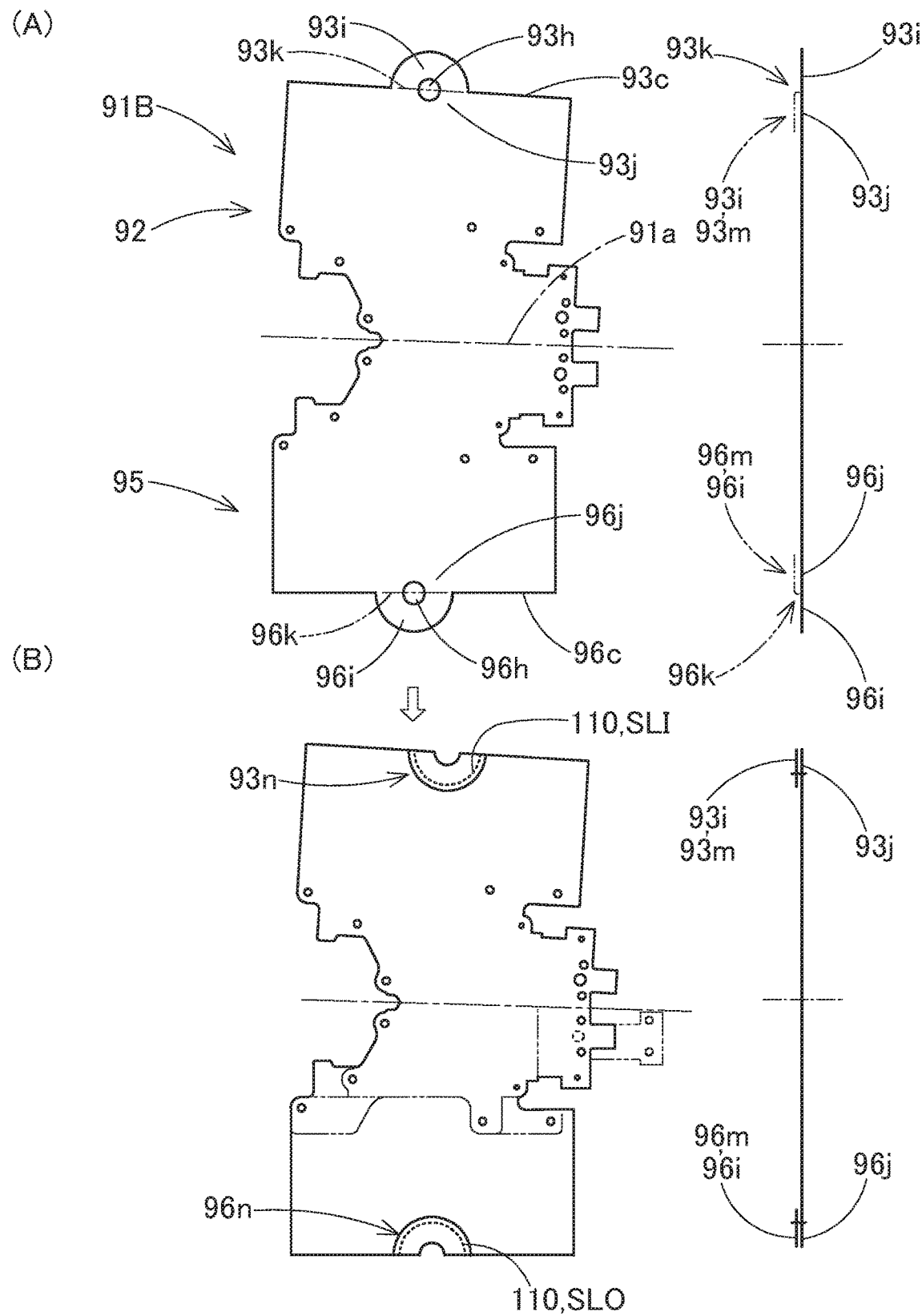

More specifically, referring to FIG. 20, a sheet material 91B for forming the redirecting cloth 82B includes, at each of terminal edges 93c and 96c of an inboard side region 92 and an outboard side region 95, a semicircular peripheral region 93*i*/96*i*. Particularly, each of the peripheral regions 93*i* and 96*i* protrudes from a vicinity of the center in a front and rear direction of the terminal edge 93*c*/96*c* and is provided with a round opening 93*h*/96*h*. A center of each of the openings 93*h* and 96*h* falls on the terminal edge 93*c*/96*c*. Then each of the peripheral regions 93*i* and 96*i* is turned up towards an inner surface 82*b* (FIG. 22) of the redirecting cloth 82B on a crease 93*k*/96*k* which is in alignment with the terminal edge 93*c*/96*c*, and the turned regions 93*m* and 96*m* (i.e. the peripheral regions 93*i* and 96*i* as turned) are respectively sewn to opposing regions 93*j* and 96*j* with sewing threads 110, thus forming turned-and-sewn regions 93*n* and 96*n*. Each of sew seams SLI and SLO of the turned-and-sewn regions 93*n* and 96*n* is formed into a generally semicircular line surrounding the opening 93*h*/96*h*.

Thereafter, as shown in FIG. 21, the sheet material 91B with an inner panel 65 positioned thereon is folded in half on a crease 91*a*, and is sewn up on the terminal edges 93*c* and 96*c* and turned-and-sewn regions 93*n* and 96*n* with a sew seam 87 and a sew seam 97 of sewing threads 110, along the terminal edges 93*c* and 96*c*. The redirecting cloth 82B is thus finished. The sew seam 87 sews the turned-and-sewn regions 93*n* and 96*n* together while the sew seam 99 sews the terminal edges 93*c* and 96*c* together.

Thereafter, in a similar fashion to the foregoing embodiment, a front tube 104 and a rear tube 106, both not-shown, are attached to the redirecting cloth 82B with seams 101 and 102 in order to form an inner module 109. If then the inner module 109 is assembled with an outer module 108 as prepared in parallel, and mounting portions 44 are attached thereto, the airbag 24B is completed. The airbag 24B is then folded and assembled with an inflator 15 to form an airbag device S for mounting on board.

Figure 22:
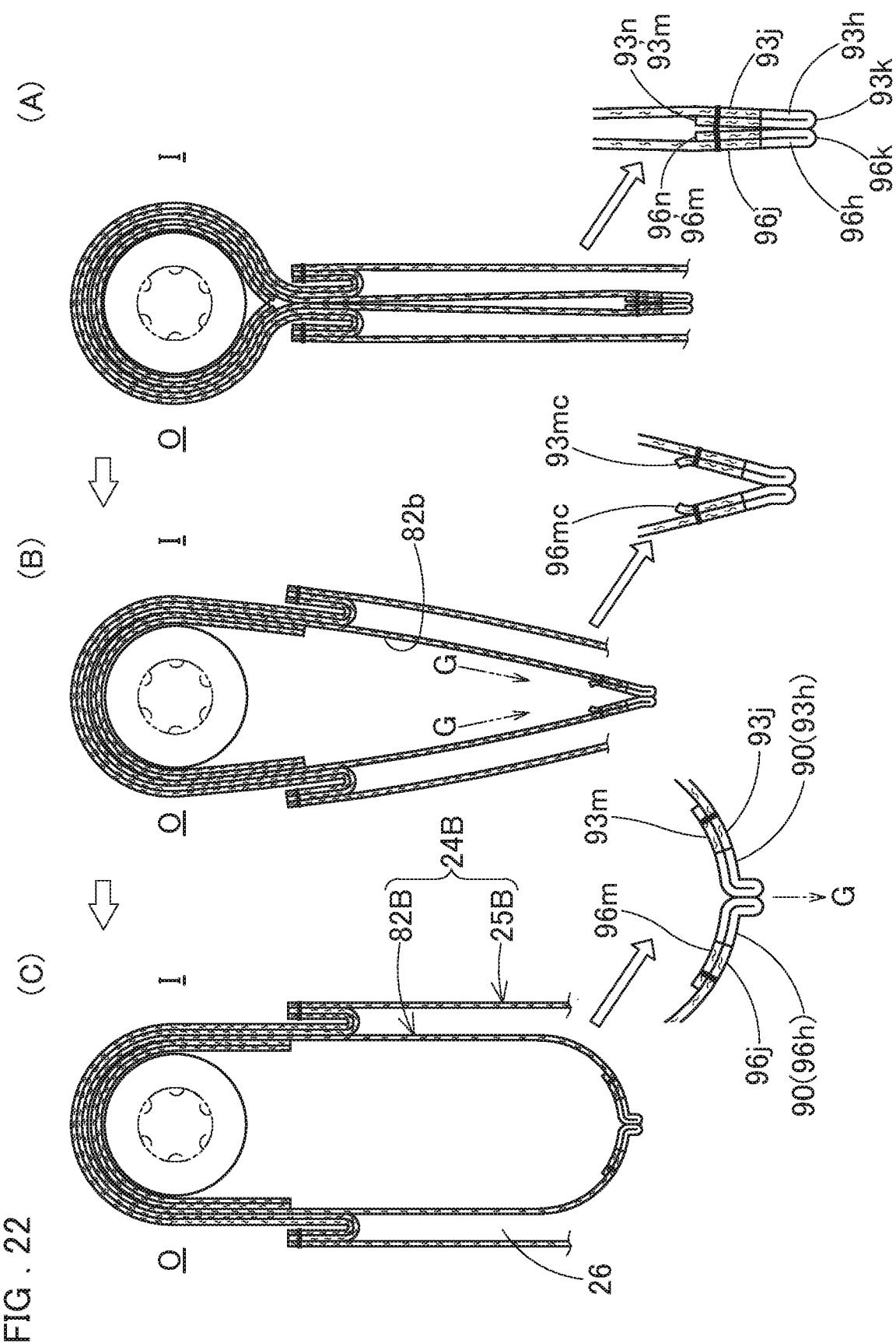
FIG. 22 illustrates the way an inflation gas flows into the redirecting cloth of FIGS. 20 and 21 by vertical sectional views taken at a terminal outlet port.
Figure 23:
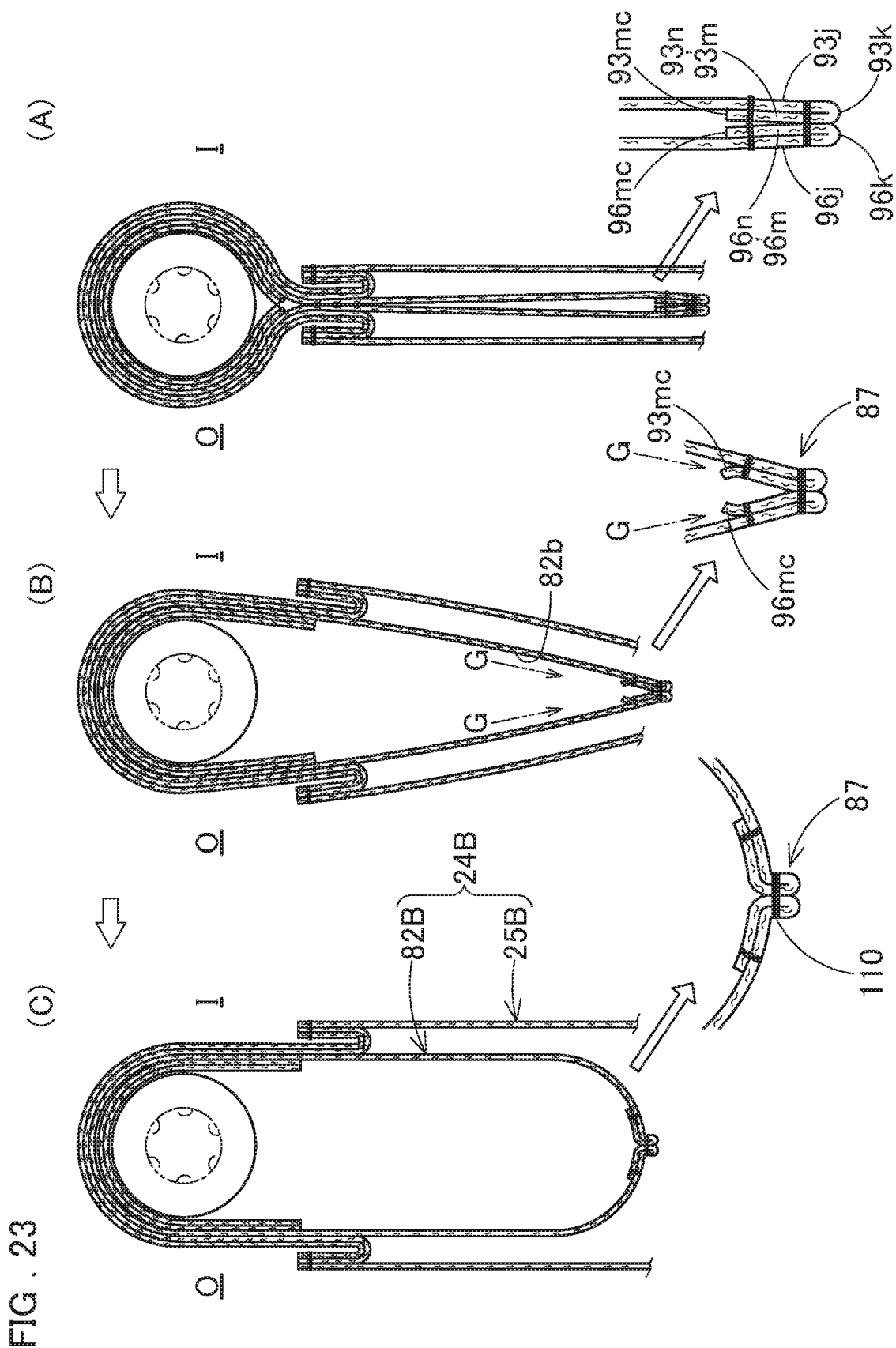
FIG. 23 illustrates the way an inflation gas flows into the redirecting cloth of FIGS. 20 and 21 by vertical sectional views taken at a periphery of the terminal outlet port.

When this airbag 24B is fed with an inflation gas G, in a vicinity of the terminal outlet port 90 of the redirecting cloth 82B, the gas G flows towards the sew seam 87 along inner surfaces 82*b* of the redirecting cloth 82B as can be seen in (A) and (B) of FIG. 22 and (A) and (B) of FIG. 23. However, in a vicinity of the seam 87 on the inner surfaces 82*b*, the edges 93*mc* and 96*mc* of the turned regions 93*m* and 96*m* of the turned-and-sewn regions 93*n* and 96*n* are disposed. The edges 93*mc* and 96*mc* engage with the gas G heading towards the seam 87 and prevent the gas G from directly hitting and damaging the sewing threads 110 forming the seam 87 in the vicinity of the terminal outlet port 90. The seam or sew region 87 of the illustrated embodiment is formed merely by forming the turned-and sewn regions 93*n* and 96*n*, i.e. turning and sewing the peripheral portions 93*i* and 96*i* of the openings 93*h* and 96*h*, and sewing the turned-and sewn regions 93*n* and 96*n* together. That is, the airbag 24B of the illustrate embodiment saves the trouble of covering the seam 87 with a tape member or layers of material of the redirecting cloth, thus has an improved heat resistance of the sew region 87 with a simple configuration.

In the airbag 24B, moreover, a peripheral region of the terminal outlet port 90 is composed of the turned-and-sewn regions 93*n* and 96*n* each of which has a double-wall structure of the turned region 93*m*/96*m* and opposing region 93*j*/96*j*. That is, the terminal outlet port 90 has a reinforced structure and is enhanced in heat resistance, and has little fear of breakage of the peripheral region even when subjected to a hot inflation gas G.

With the redirecting cloth 82B of the airbag 24B, an inflation gas G is taken in via the inlet port 85 and released from the front outlet port 88, rear outlet port 89 and terminal outlet port 90.

Figure 24:
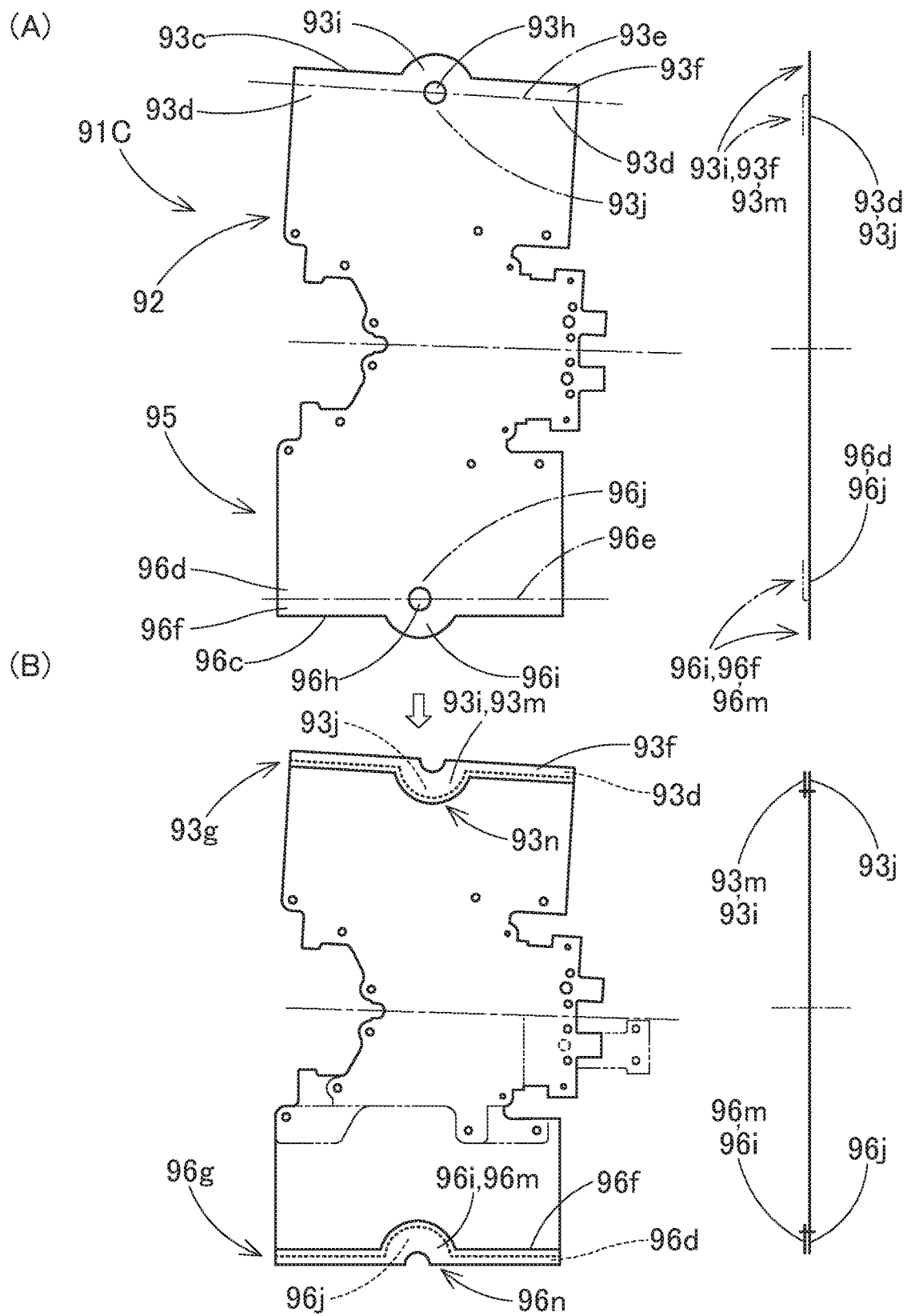
FIGS. 24 and 25 illustrates yet another modification of the redirecting cloth and a production process of the same.
Figure 25:
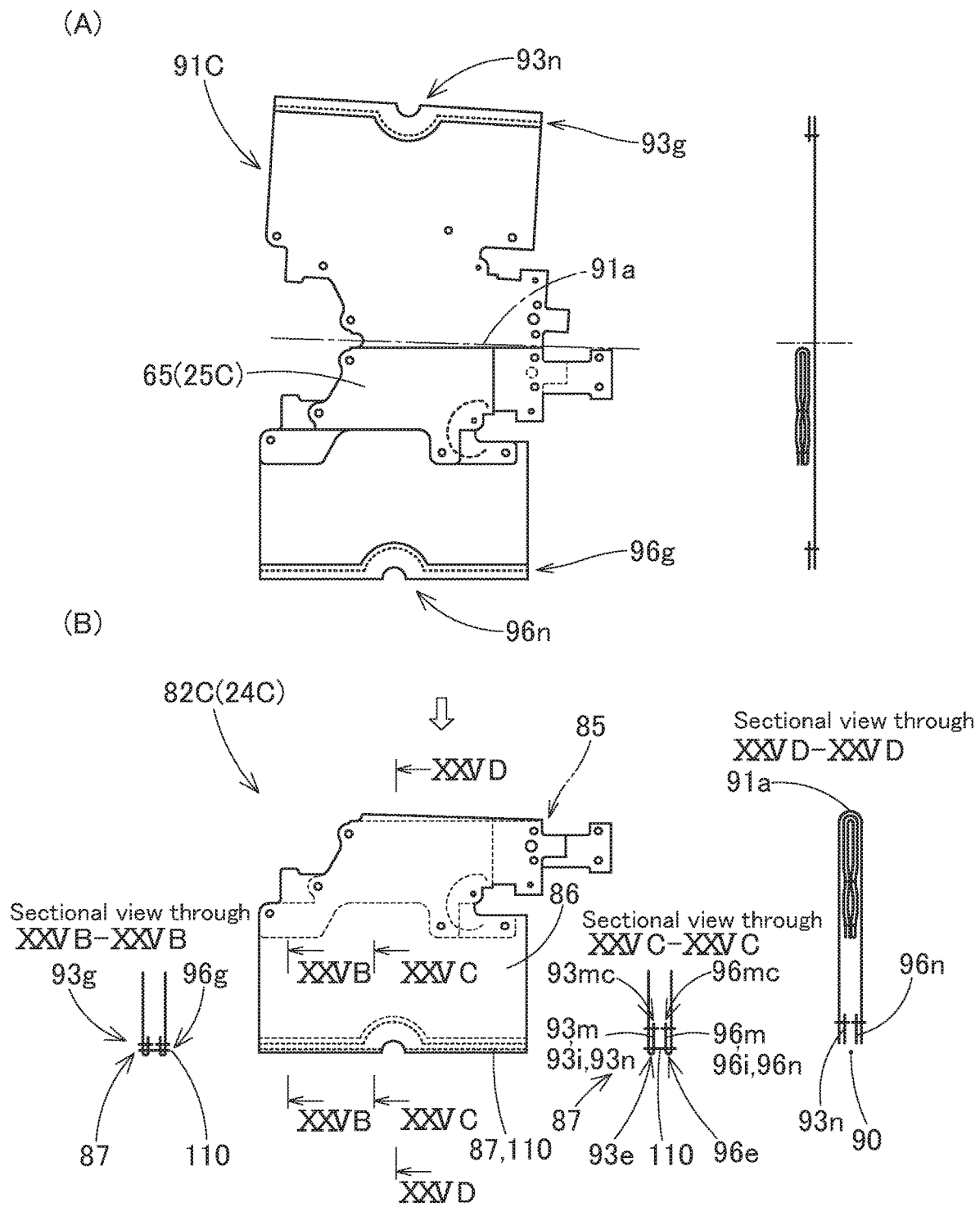

Further alternatively, unlike in the redirecting cloth 82B, the turned-and-sewn region may be formed in an entirety of each of the terminal edges 93*c* and 96*c* of the sheet material 91 to be sewn together to form the sew seam 87, as in a redirecting cloth 82C of a bag body 25C of an airbag 24C shown in FIGS. 24 and 25. More specifically, as shown in FIG. 24, each of opposite edges 93*c* and 96*c* of a sheet material 91 for forming the redirecting cloth 82C is entirely, including a peripheral portion 93*i*/96*i* of an opening 93*h*/96*h*, turned up inward on a crease 93*e*/96*e* running through a center of the opening 93*n*/96*h*, and turned regions 93*f*, 96*f*, 93*m* and 96*m* are respectively sewn to opposing regions 93*d*, 96*d*, 93*j* and 96*j*, thus forming turned-and-sewn regions 93*g*, 96*g*, 93*n* and 96*n*. Thereafter, as shown in FIG. 25, the sheet material 91C is folded in half on a crease 91*a*, and the turned-and-sewn regions 93*g* and 96*g*, 93*n* and 96*n* are each sewn together with a sew region 87. The redirecting cloth 82C is thus finished. Thereafter, in a similar fashion to the foregoing embodiments, a front tube 104 and a rear tube 106, both not shown, are attached to the redirecting cloth 82C with seams 101 and 102 in order to form an inner module 109. If then the inner module 109 is assembled with an outer module 108 as prepared in parallel, the airbag 24C is completed.

When the redirecting cloth includes a terminal outlet port 90, the turned-and-sewn regions may be formed on the periphery of the terminal outlet port 90 only, i.e. only on a portion requiring heat resistance, as in the redirecting cloth 82B of the airbag 24B shown in FIGS. 20 to 23. Alternatively, as in the redirecting cloth 82C of the airbag 24C shown in FIGS. 24 and 25, the entire sew region 87 may be formed by sewing turned-and-sewn regions together.

In a redirecting cloth having no terminal outlet port 90, such as the redirecting cloth 82/82A having the front and rear outlet ports 88 and 89 only, or a redirecting cloth having one inlet port and only one outlet port, as long as the redirecting cloth is formed by sewing opposite terminal edges of a sheet material together, the turned-and-sewn region may be formed on a portion of the sew region requiring a strength, or may be formed on an entire sew region.

In the airbag 24, the redirecting cloth 82 includes the redirecting body 86 in which the outlet ports 88 and 89 and the sew region 87 are disposed; the root region 83 that is tubular in contour and extends from the redirecting body 86; and the mouth region 84 that is tubular in contour and bends and extends from the leading end of the root region 83. The mouth region 84 includes, at the end, the inlet port 85 for receiving the inflator 15 for taking in an inflation gas. The redirecting cloth 82 is formed by folding the sheet material 91 in half on the crease 91*a* and sewing peripheral edges 83*c*, 83*e*, 84*c* and 86*c* together such that the inlet port 85 and outlet ports 89 are formed and the crease 91*a* forms the far-side edge 82*a* of the redirecting cloth 82, i.e. the edges of the root region 83 and mouth region 84 facing away from the redirecting body 86. There is disposed the inner panel (or reinforcing panel, for enhancing heat resistance) 65 in an interior of the mouth region 84 and root region 83 of the redirecting cloth 82. The inner panel 65 is formed by folding the inner-panel sheet material 71 in half on the crease 71*a*, and sewing together the leading edge 66*c* (i.e. the leading edges 73*a* and 76*a* of the sheet material 71) which adjoins the crease 71*a* and is disposed apart from the inlet port 85, with the leading edge 83*c* of the redirecting cloth 82 which is disposed apart from the inlet port 85. The crease 71*a* of the inner panel 65 is disposed proximate to and at an inner side of the crease 91*a* of the redirecting cloth 82 such that a gap 81 is formed between the creases 71a and 91a of the inner panel 65 and the redirecting cloth 82 at a vicinity of the leading edges 66c and 83c of the inner panel 65 and redirecting cloth 82, thus forming a portion which is composed of the sheet material 91 of the redirecting cloth 82 only. The sew seam 78 that sews the leading edges 66c and 83c of the inner panel 65 and redirecting cloth 82 together extends beyond the crease 71a of the inner panel 65 and continues to the portion composed of the sheet material 91 of the redirecting cloth 82 only.

Figure 26A:
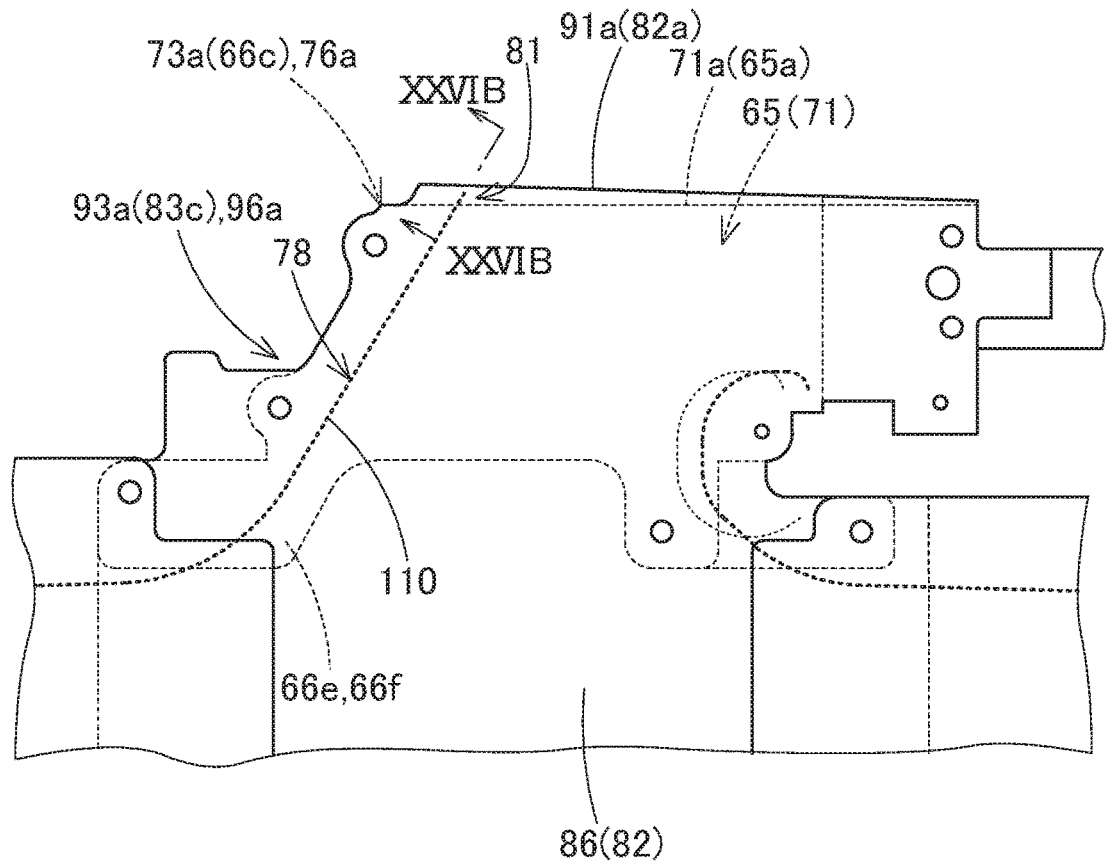
FIG. 26A is an enlarged front elevation of leading edge regions of the inner panel and redirecting cloth.
Figure 26B:
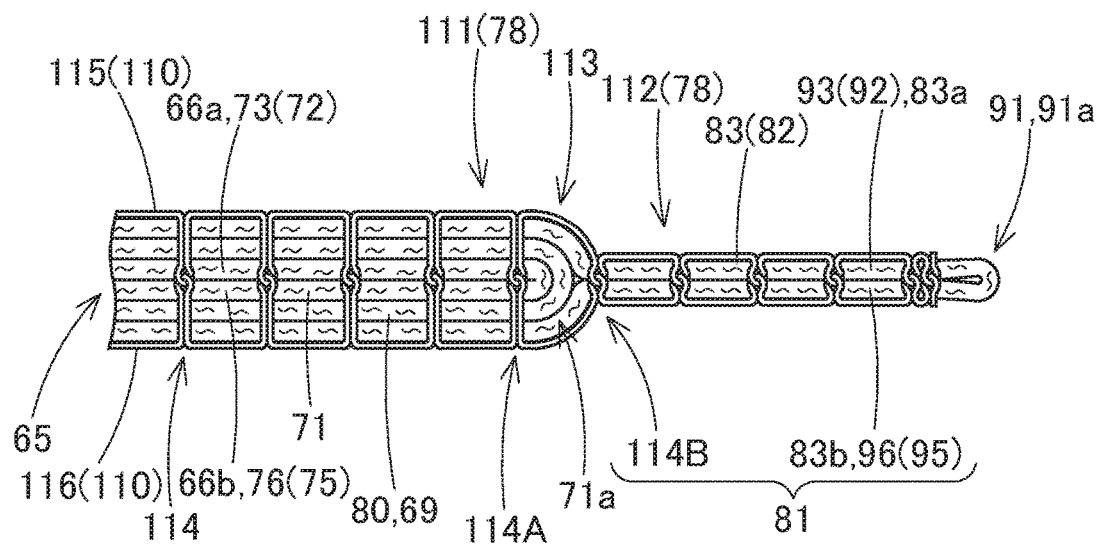
FIG. 26B is an enlarged sectional view taken along line XXVIB-XXVIB of FIG. 26A.

As shown in FIGS. 26A and 26B, the sew seam 78 that sews the leading edge 66c of the inner panel 65 (i.e. the leading edges 73a and 76a of the sheet material 71) and the leading edge 83c of the redirecting cloth 82 (i.e. the leading edges 93a and 96a of the sheet material 91) together extends beyond the crease 71a to the portion composed of the sheet material 91 of the redirecting cloth 82 only. That is, the sew seam 78 completely sews the leading edges 73a and 76a of the sheet material 71 together from the lower edges 66e and 66f to a posterior of the crease 71a. The sewing threads 110 of the sew seam 78 surrounds the crease 71a at the vicinity of the leading edge 66c of the inner panel 65 and the sew seam 78 continues to the redirecting body 86, thus ensuring the gas sealing property of the crease 71a in the vicinity of the leading edge 66c of the inner panel 65. This configuration will prevent an inflation gas G from leaking from the leading edge 66c of the inner panel 65 and help forward the gas towards the redirecting body 86 smoothly.

In other words, the seam 78 includes the multi-object region 111 that sews the inner panel 65 and redirecting cloth 82 together and the single-object region 112 that is disposed at the portion beyond the crease 71a and sews the redirecting cloth 82 only. In the boundary 113 between the multi-object region 111 and single-object region 112 of the seam 78, the upper thread 115 and lower thread 116 forming the stitch that bridges across the boundary 113, i.e. that is spanned between the stitching holes 114A and 114B closest to the boundary 113, surround or encompass the crease 71a, such that the inner surfaces of the inboard side wall 66a and the outboard side wall 66b are brought into close contact with each other, and the gas sealing property of the crease 71a is ensured.

If, unlike the foregoing embodiments, the inner panel is disposed inside the redirecting cloth in such a manner that the creases of the inner panel and redirecting cloth are brought into close contact each other without a gap, it will not be possible to sew the leading edges of the inner panel and redirecting cloth together completely to a posterior or exterior of the crease of the inner panel. In that instance, an unsewn region will be formed and permit gas leakage.

An alternative embodiment of the invention is now described.

Figure 27A:
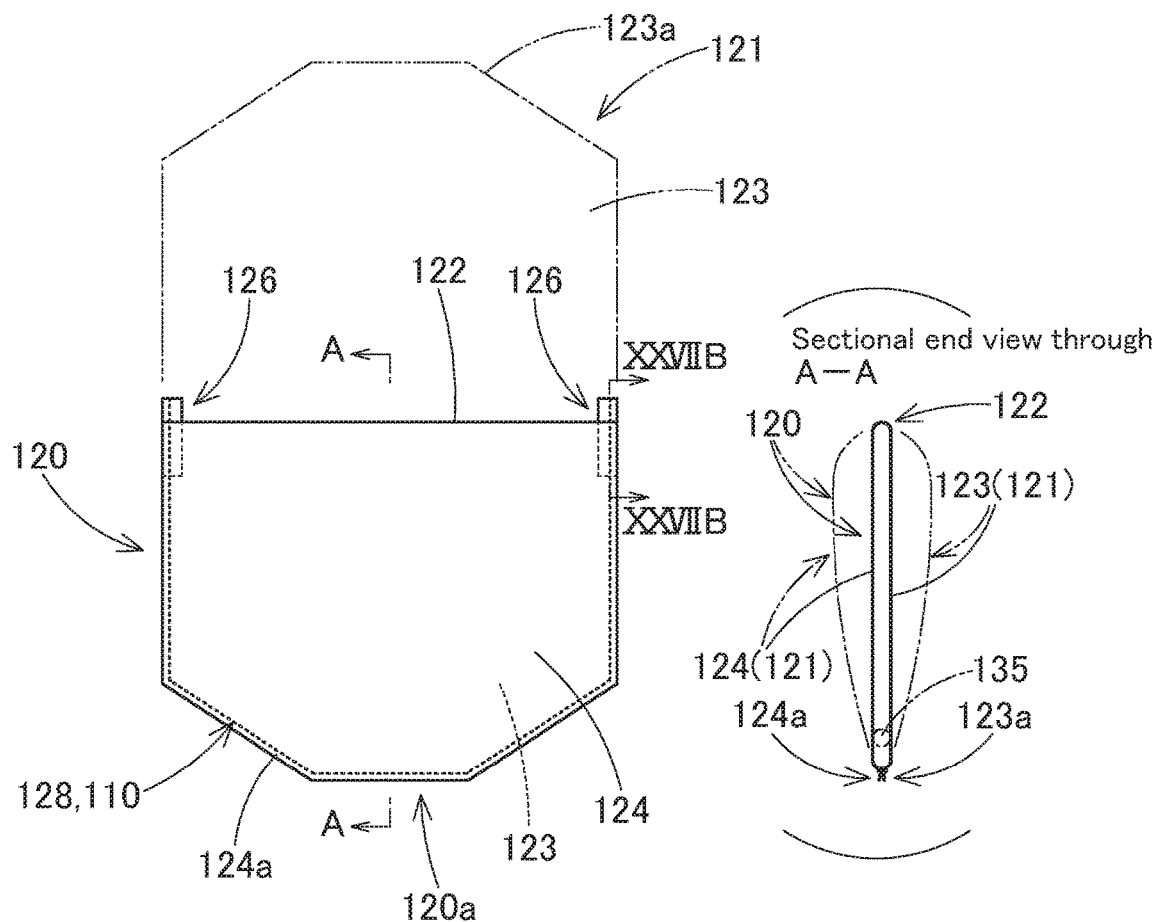
FIG. 27A is a front elevation of an airbag according to an alternative embodiment.
Figure 27B:
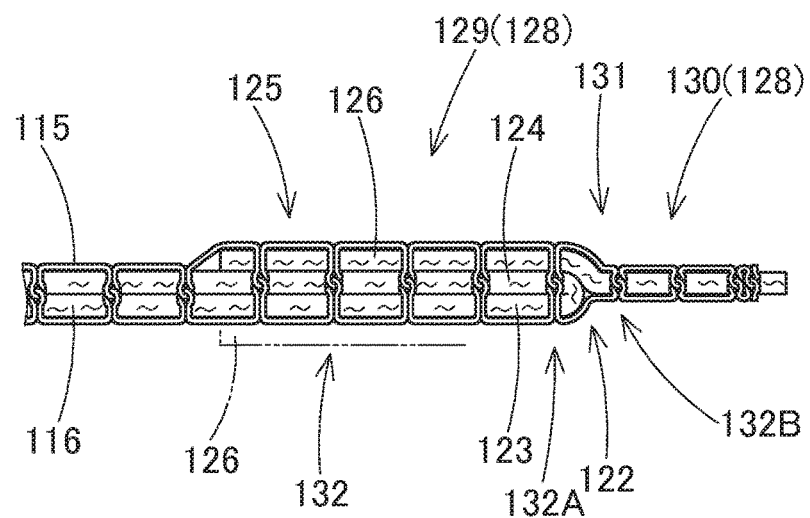
FIG. 27B is a sectional view taken along line XXVIIB-XXVIIB of FIG. 27A.

FIG. 27A depicts an airbag (or airbag member) 120 for knee protection according to the alternative embodiment. The airbag 120 is designed to be inflated with an inflation gas in such a manner as to separate the opposing walls, i.e. separate an outboard side wall 123 from an inboard side wall 124. The airbag 20 is formed by folding a single sheet material 121 having flexibility in half on a crease 122 and sewing opposite outer circumferential edges 123a and 124a together with a sew seam 128 of lockstitch. That is, each of the outboard side wall 123 and the inboard side wall 124 is defined by the crease 122 and sew seam 128. A patch member 126, which is composed of a sheet material having flexibility, is applied to an outer surface of either the outboard side wall 123 or the inboard side wall 124, (to the outboard side wall 123, in this specific embodiment), and as shown in FIG. 27B, the sew seam 128 is formed to extend across a portion 125 in which the outboard side wall 123, the inboard side wall 124 and the patch member 126 overlap (namely, a multiwall portion 125) and a portion (namely, simplex portion) composed of the patch member 126 only, beyond the crease 122.

As indicated with a double-dotted line in FIG. 27A, an inflator 135 is disposed inside a lower end region 120a, which is apart from the crease 122, of the airbag 120, for feeding an inflation gas to the airbag 120. When deployed, the airbag 120 casts the upper portion having the crease 122 and protects knees of a driver or a passenger with the inboard side wall 124.

With the aid of the patch member 126, the sew seam 128 is able to sew the outer circumferential edges 123a and 124a of the outboard side wall 123 and inboard side wall 124 together completely. With this configuration, when the airbag 120 is inflated and the outboard side wall 123 and the inboard side wall 124 separate from each other, the sewing threads 110 which are spanned between stitching holes 132A and 132B adjoining the crease 122 surround or encompass the crease 122 as shown in FIG. 27B, such that a gas sealing property of a vicinity of the crease 122 is ensured, and a gas leakage from the vicinity of the crease 122 is prevented.

In other words, the seam 128 includes a multi-object region 129 that sews the sheet material 121 and patch member 126 together and a single-object region 130 that is disposed at the portion beyond the crease 122 and sews the patch member 126 only. In a boundary 131 between the multi-object region 129 and single-object region 130 of the seam 128, an upper thread 115 and a lower thread 116 forming the stitch that bridges the boundary 131, i.e. that is spanned between the stitching holes 132A and 132B closest to the boundary 131, surround or encompass the crease 122, such that the inner surfaces of the inboard side wall 124 and the outboard side wall 123 are brought into close contact with each other at the vicinity of the crease 122, and the gas sealing property of the crease 122 is ensured.

In the illustrated embodiment, the patch member 126 is applied to the outer surface of the outboard side wall 123 only. However, it may be applied to an outer surface of the inboard side wall 124 as well. In that instance, the patch member may be composed of a piece of material as folded in half.

The configuration that an airbag member is folded in half and completely sewn up by the outer circumferential edge with the aid of a patch member in order to ensure gas sealing property of a vicinity of the crease may also be applied to a redirecting cloth or an inner tube disposed inside the airbag, not only to the airbag 120. In the airbag 24 of the foregoing embodiment, the redirecting cloth 82 serves as the patch member and the inner panel 65 serves as the airbag member, and the redirecting cloth 82 helps ensure a gas sealing property of the crease 71a of the inner panel 65 in the vicinity of the opposite leading edges 73a and 76a.

In the foregoing embodiment, the airbag 24 provided with a redirecting cloth was described as employed in the head-protecting airbag device S. However, so far as the redirecting cloth is formed by sewing outer circumferential edges of a single sheet material together, the invention may also be applied to an airbag for a driver's seat, an airbag for a passenger seat, an airbag for pedestrian protection, an airbag for knee protection, or the like.

What is claimed is:

1. An airbag adapted to be mounted on a vehicle, comprising:
   a body;
   a redirecting cloth that is composed of a single sheet material having flexibility and disposed inside the body, the redirecting cloth including:
   an inlet port for taking in an inflation gas;
   one or more outlet ports that release the inflation gas as flown from the inlet port towards predetermined regions of the body; and
   a sew region that sews first and second terminal edges of the sheet material together, wherein each of the first and second terminal edges of the sheet material includes a turned-and-sewn region that has been turned inward and sewn, and at least a part of the sew region sews terminals of the turned-and-sewn regions together, wherein
   the redirecting cloth is formed by folding the sheet material in half on a crease and sewing resulting opposite peripheral edges together such that the inlet port and outlet ports are formed,
   the redirecting cloth further comprises:
   a redirecting body in which the outlet port and the sew region are disposed;
   a root region that is tubular in contour and extends from the redirecting body;
   a mouth region that is tubular in contour and bends and extends from an end of the root region, the mouth region including, at an end thereof, the inlet port for receiving an inflator which emits the inflation gas;
   a leading edge that adjoins the crease and is disposed apart from the inlet port; and
   an inner panel that is disposed in an interior of the mouth region and root region,
   the crease of the redirecting cloth forms edges of the root region and mouth region disposed apart from the redirecting body;
   the inner panel is composed of an inner-panel sheet material as folded in half on a crease, at least a leading edge of the inner panel, which adjoins the crease and is disposed apart from the inlet port, being sewn together with the leading edge of the redirecting cloth;
   the crease of the inner panel is disposed proximate to and at an inner side of the crease of the redirecting cloth such that a gap is formed between the creases of the inner panel and the redirecting cloth at a vicinity of the leading edges of the inner panel and redirecting cloth, thus forming a portion which is composed of the sheet material of the redirecting cloth only; and
   a sew seam that sews the leading edges of the inner panel and redirecting cloth together extends beyond the crease of the inner panel and continues to the portion composed of the sheet material of the redirecting cloth only.

2. The airbag of claim 1, wherein a sew seam of the turned-and-sewn region of the first terminal edge of the sheet material and a sew seam of the turned-and-sewn region of the second terminal edge of the sheet material are displaced from each other.

3. The airbag of claim 2, wherein the redirecting cloth further includes, between the terminals of the turned-and-sewn regions, a terminal outlet port for releasing the inflation gas.

4. The airbag of claim 1, wherein an entirety of the sew region is formed by sewing the turned-and-sewn regions together.

5. An airbag adapted to be mounted on a vehicle, comprising:
   a body;
   a redirecting cloth that is composed of a single sheet material having flexibility and disposed inside the body, the redirecting cloth including:
   an inlet port for taking in an inflation gas;
   one or more outlet ports that release the inflation gas as flown from the inlet port towards predetermined regions of the body; and
   a sew region that sews first and second terminal edge regions of the sheet material together,
   wherein each of the first and second terminal edge regions of the sheet material includes a turned-and-sewn region that has been turned inward and sewn, and at least a part of the sew region sews terminals of the turned-and-sewn regions together,
   wherein each of the turned-and-sewn regions includes a crease that folds the terminal edge region of the sheet material inwardly toward the inlet port;
   wherein the sew region is disposed between the creases and terminal edges of the sheet material.

6. The airbag of claim 5, wherein a sew seam of the turned-and-sewn region of the first terminal edge of the sheet material and a sew seam of the turned-and-sewn region of the second terminal edge of the sheet material are displaced from each other.

7. The airbag of claim 5, wherein an entirety of the sew region is formed by sewing the turned-and-sewn regions together.

8. The airbag of claim 5, wherein: the redirecting cloth is formed by folding the sheet material in half on a crease and sewing resulting opposite peripheral edges together such that the inlet port and outlet ports are formed, the redirecting cloth further comprises:
   a redirecting body in which the outlet port and the sew region are disposed;
   a root region that is tubular in contour and extends from the redirecting body;
   a mouth region that is tubular in contour and bends and extends from an end of the root region, the mouth region including, at an end thereof, the inlet port for receiving an inflator which emits the inflation gas;
   a leading edge that adjoins the crease and is disposed apart from the inlet port; and
   an inner panel that is disposed in an interior of the mouth region and root region,
   the crease of the redirecting cloth forms edges of the root region and mouth region disposed apart from the redirecting body;
   the inner panel is composed of an inner-panel sheet material as folded in half on a crease, at least a leading edge of the inner panel, which adjoins the crease and is disposed apart from the inlet port, being sewn together with the leading edge of the redirecting cloth;
   the crease of the inner panel is disposed proximate to and at an inner side of the crease of the redirecting cloth such that a gap is formed between the creases of the inner panel and the redirecting cloth at a vicinity of the leading edges of the inner panel and redirecting cloth, thus forming a portion which is composed of the sheet material of the redirecting cloth only; and a sew seam that sews the leading edges of the inner panel and redirecting cloth together extends beyond the crease of the inner panel and continues to the portion composed of the sheet material of the redirecting cloth only.

* * * * *